United States Patent
Minoshima et al.

(10) Patent No.: US 6,901,462 B2
(45) Date of Patent: May 31, 2005

(54) RECEIVING APPARATUS AND FLOW CONTROL METHOD THEREFOR AND TRANSMITTING APPARATUS AND FLOW CONTROL METHOD THEREFOR

(75) Inventors: Kunihiro Minoshima, Saitama (JP); Hidemi Usuba, Saitama (JP); Shinsuke Nishimura, Saitama (JP)

(73) Assignee: Pioneer Corporation, Tokyo (JP)

( * ) Notice: Subject to any disclaimer, the term of this patent is extended or adjusted under 35 U.S.C. 154(b) by 52 days.

(21) Appl. No.: 10/145,757

(22) Filed: May 16, 2002

(65) Prior Publication Data

US 2002/0174245 A1 Nov. 21, 2002

(30) Foreign Application Priority Data

May 17, 2001 (JP) ...................................... P.2001-148531

(51) Int. Cl.[7] .............................................. G06F 13/14
(52) U.S. Cl. ............................ 710/29; 710/52; 710/58; 710/60; 341/61; 341/123
(58) Field of Search ............................. 710/29, 52, 58, 710/60, 33, 53, 59; 341/61, 123

(56) References Cited

U.S. PATENT DOCUMENTS

| | | | | |
|---|---|---|---|---|
| 5,526,125 A | * | 6/1996 | Mori et al. ................... | 386/52 |
| 5,689,534 A | | 11/1997 | Anderson et al. | |
| 5,710,807 A | * | 1/1998 | Smith .................... | 379/114.01 |
| 5,841,387 A | * | 11/1998 | VanBuskirk ................ | 341/155 |
| 6,154,154 A | * | 11/2000 | Suzuki et al. ................. | 341/61 |
| 6,535,936 B2 | * | 3/2003 | Young .......................... | 710/62 |

FOREIGN PATENT DOCUMENTS

| | | | |
|---|---|---|---|
| EP | 0 825 784 A2 | 2/1998 | |
| GB | 2 321 334 A | 7/1998 | |
| JP | 403098188 A | * 4/1991 | .......... G06K/19/04 |
| JP | 7-240088 A | 9/1995 | |
| WO | WO 98/53404 A1 | 11/1998 | |

OTHER PUBLICATIONS

1394 Trade Association: Audio and Music Data Transmission Protocol:, Version 1.0, Online! May 1997, pp. 1–23, XP002252221.

* cited by examiner

*Primary Examiner*—Rehana Perveen
(74) *Attorney, Agent, or Firm*—Sughrue Mion, PLLC

(57) ABSTRACT

A receiving apparatus constructed to store data received from a network in a buffer and read the data in the buffer based on a reference clock, has a detecting means for detecting change of a sampling frequency of the data, a first controlling means for controlling to stop writing of the data into the buffer and reading of the data from the buffer in response to an output of the detecting means, a clearing means for clearing the data in the buffer in response to the output of the detecting means, a clock changing means for changing a frequency of the reference clock in response to the output of the detecting means, and a second controlling means for controlling to restart the writing of the data into the buffer and the reading of the data from the buffer in response to the output of the detecting means.

26 Claims, 11 Drawing Sheets

RECEIVING APPARATUS AND FLOW CONTROL METHOD THEREFOR AND TRANSMITTING APPARATUS AND FLOW CONTROL METHOD THEREFOR

The present disclosure relates to the subject matter contained in Japanese Patent Application No.2001-148531 filed on May 17, 2001, which is incorporated herein by reference in its entirety.

BACKGROUND OF THE INVENTION

1. Technical Field of the Invention

The present invention relates to a receiving apparatus for storing data received from the network in a buffer and then reading the data in the buffer based on a reference clock, a transmitting apparatus for transmitting the reproduced data to the network, and their flow control methods.

2. Description of the Related Art

The digital audio/video system capable of achieving the high quality-of-audio reproduction by transmitting the digital audio data or digital video data, which is reproduced by the reproducing device such as the DVD (Digital Versatile Disc) player, etc., to the network including the transmission line such as the serial bus (IEEE Std.1394-1955 IEEE Standard for a High Performance Serial Bus) based on the IEEE 1394 standard, etc. and also receiving the audio data by the receiving apparatus such as the amplifier, etc., is being implemented.

In the related art, the receiving apparatus such as the amplifier, etc. reproduces the audio by reproducing the clock information on the transmitting apparatus side by using PLL on the receiving apparatus side.

However, if such receiving apparatus such as the amplifier, etc. according to the related art is applied to the above digital audio/video system, there is such a problem that the degradation of the quality of audio due to the jitter of the PLL is brought about.

In order to overcome the problem that the above degradation of the quality of audio is caused, the method of applying the flow control method according to the related art to the receiving apparatus is considered.

This flow control method according to the related art is the method that controls the transmitting apparatus by storing the data in the buffer on the receiving apparatus side and transmitting the control signal not to cause the overflow or the underflow, e.g., to maintain the reproducing speed on the transmitter side within the speed variation of ±1%.

If such flow control method according to the related art is applied to the receiving apparatus, the reproduction of the high quality audio can be achieved by storing the data received on the receiving apparatus side in the buffer and then reading the data from the buffer by using the clock with the quartz precision to reproduce the audio.

However, in the receiving apparatus to which the above flow control method according to the related art is applied, if FS (sampling frequency) of the transmitted data is changed during the transmission, the clock on the receiving apparatus side must be changed to meet the changed FS. At this time, since the data stored by using the FS before the change still remain in the inside of the buffer, it is impossible to carry out the reproducing process. As a result, the disadvantages such as the interrupt of the reproduction of the audio, etc. are caused.

The present invention has been made in view of the problem and disadvantage mentioned above, and it is an object of the present invention to provide a receiving apparatus and a flow control method therefor and a transmitting apparatus and a flow control method there for capable of reproducing the high quality audio not to cause the disadvantages such as the interrupt of the audio reproduction, etc. when the sampling frequency is changed.

SUMMARY OF THE INVENTION

According to a first aspect of the invention, there is provided a receiving apparatus having:

a buffer for storing data received from a network;

a detecting device for detecting change of a sampling frequency of the data;

a first controlling device for controlling to stop writing of the data into the buffer and reading of the data from the buffer in response to an output of the detecting device;

a clearing device for clearing the data in the buffer in response to the output of the detecting device;

a clock changing device for changing a frequency of a reference clock in response to the output of the detecting device; and a second controlling device for controlling to restart the writing of the data into the buffer and the reading of the data from the buffer in response to the output of the detecting device, wherein the data stored in the buffer is read based on the reference clock.

Therefore, when the sampling frequency is changed, the data in the buffer is cleared and also the reference clock is changed into the reference clock that corresponds to the changed sampling frequency.

According to a second aspect of the invention, there is provided a receiving apparatus having:

a buffer for storing data received from a network;

a first detecting device for detecting change of a sampling frequency of the data;

a first controlling device for controlling to stop writing of the data into the buffer in response to an output of the first detecting device;

a second detecting device for detecting that the data in the buffer becomes empty;

a second controlling device for controlling to stop the reading of the data from the buffer in response to an output of the second detecting device;

a clock changing device for changing a frequency of a reference clock in response to the output of the second detecting device; and a third controlling device for controlling to restart the writing of the data into the buffer and the reading of the data from the buffer in response to the output of the second detecting device, wherein the data stored in the buffer is read based on the reference clock.

Therefore, the writing into the buffer is stopped when the sampling frequency is changed, and then the reference clock is changed into the reference clock that corresponds to the changed sampling frequency after the buffer becomes empty.

According to a third aspect of the invention, there is provided a transmitting apparatus constructed to transmit reproduced data to a network, the transmitting apparatus having:

a first detecting device for detecting change of a reproduced track;

a first controlling device for setting data reproduction to a pause state in response to an output of the first detecting device;

a second detecting device for detecting reception of a pause cancel signal; and a second controlling device for canceling the pause state in response to an output of the second detecting device.

Therefore, the data reproduction is brought into the pause state every time when the track is changed, and then the pause state is canceled to restart the data reproduction when the pause cancel signal is received.

According to a fourth aspect of the invention, there is provided a receiving apparatus having:

a buffer for storing data received from a network;

a first detecting device for detecting a pause state on a transmitter side;

a second detecting device for detecting change of a sampling frequency of the data in response to an output of the first detecting device;

a first controlling device for controlling to stop writing of the data into the buffer in response to an output of the second detecting device;

a third detecting device for detecting that the data in the buffer becomes empty;

a second controlling device for controlling to stop reading of the data from the buffer in response to an output of the third detecting device;

a clock changing device for changing a frequency of a reference clock in response to the output of the third detecting device;

a third controlling device for controlling to restart the writing of the data into the buffer and the reading of the data from the buffer; and a control signal transmitting device for transmitting a pause cancel signal to the transmitter side, wherein the data in the buffer is read based on the reference clock.

Therefore, the pause state on the transmitter side is detected and then the writing into the buffer is stopped when the sampling frequency is changed. Then, after the buffer becomes empty, the reference clock is changed into the reference clock that corresponds to the changed sampling frequency and also the pause cancel signal to restart the operation on the transmitter side is transmitted.

According to a fifth aspect of the invention, there is provided a receiving apparatus having:

a buffer for storing data received from a network;

a first detecting device for detecting change of a sampling frequency of the data;

a first controlling device for controlling to stop writing of the data into the buffer in response to an output of the first detecting device;

a first control signal transmitting device for transmitting a pause signal to a transmitter side;

a second detecting device for detecting that the data in the buffer becomes empty;

a second controlling device for controlling to stop reading of the data from the buffer in response to an output of the second detecting device;

a clock changing device for changing a frequency of a reference clock in response to the output of the second detecting device;

a third controlling device for controlling to restart the writing of the data into the buffer and the reading of the data from the buffer in response to the output of the second detecting device; and a second control signal transmitting device for transmitting a pause cancel signal to the transmitter side in response to the output of the second detecting device, wherein the data in the buffer is read based on the reference clock.

Therefore, when the sampling frequency is changed, the signal that brings the data reproduction into the pause state is transmitted to the transmitter side and also the writing into the buffer is stopped. Then, after the buffer becomes empty, the reference clock is changed into the reference clock that corresponds to the changed sampling frequency and also the pause cancel signal that restarts the operation on the transmitter side is transmitted.

According to a sixth aspect of the invention, there is provided a transmitting apparatus constructed to transmit reproduced data to a network, the transmitting apparatus having:

a first detecting device for detecting change of a sampling frequency of the data;

a first controlling device for setting data reproduction to a pause state in response to an output of the first detecting device;

a second detecting device for detecting reception of a pause cancel signal; and a second controlling device for canceling the pause state in response to an output of the second detecting device.

Therefore, the data reproduction is brought into the pause state every time when the sampling frequency is changed, and then the pause state is canceled to restart the data reproduction when the pause cancel signal is received.

According to a seventh aspect of the invention, there is provided a receiving apparatus having:

a buffer for storing data received from a network;

a first detecting device for detecting change of a sampling frequency of the data;

a first controlling device for controlling to stop writing of the data into the buffer in response to an output of the first detecting device;

a second detecting device for detecting that the data in the buffer becomes empty;

a second controlling device for controlling to stop reading of the data from the buffer in response to an output of the second detecting device;

a clock changing device for changing a frequency of the reference clock in response to the output of the second detecting device;

a third controlling device for controlling to restart the writing of the data into the buffer and the reading of the data from the buffer in response to the output of the second detecting device; and a control signal transmitting device for transmitting a pause cancel signal to a transmitter side, wherein the data stored in the buffer is read based on the reference clock.

Therefore, when the change of the sampling frequency is detected, the writing into the buffer is stopped. Then, after the buffer becomes empty, the reference clock is changed into the reference clock that corresponds to the changed sampling frequency and also the pause cancel signal to restart the operation on the transmitter side is transmitted.

According to an eighth aspect of the invention, there is provided a receiving apparatus having:

a plurality of buffers for storing data received from a network;

a first detecting device for detecting change of a sampling frequency of the data;

a first controlling device for controlling to stop writing of the data into one buffer in response to an output of the first detecting device;

a first clock changing device for changing a frequency of a first reference clock in response to an output of the first detecting device;

a second controlling device for controlling to start the writing of the data into other buffer in response to the output of the first detecting device;

a second detecting device for detecting that the data in one buffer becomes empty;

a third controlling device for controlling to stop the reading of the data from the one buffer in response to an output of the second detecting device;

a second reference clock changing device for changing a frequency of a second reference clock in response to the output of the second detecting device; and a second controlling device for controlling to start the reading of the data from the other buffer in response to the output of the second detecting device, wherein the data stored in the buffer is read based on the plurality of reference clocks.

Therefore, when the sampling frequency is changed, the reading of the data, which is obtained before the change, from one buffer is still continued and also the data, which is obtained after the change, is written into the other buffer after the reference clock on the writing side is changed. Then, the reference clock on the reading side is changed as soon as the data in one buffer is out, and then the buffer to be read is switched into the other buffer.

According to a ninth aspect of the invention, there is provided a flow controlling method of a receiving apparatus having the steps of:

writing data received from a network into a buffer;

reading the data in the buffer based on a reference clock;

detecting change of a sampling frequency of the data;

controlling to stop writing of the data into the buffer and reading of the data from the buffer when the change of the sampling frequency of the data is detected;

clearing the data in the buffer;

changing a frequency of the reference clock; and restarting the writing of the data into the buffer and the reading of the data from the buffer.

Therefore, when the sampling frequency is changed, the data in the buffer is cleared and also the reference clock is changed into the reference clock that corresponds to the changed sampling frequency.

According to a tenth aspect of the invention, there is provided a flow controlling method of a receiving apparatus having the steps of:

writing data received from a network into a buffer;

reading the data in the buffer based on a reference clock;

detecting change of a sampling frequency of the data;

stopping writing of the data into the buffer when the change of the sampling frequency of the data is detected;

detecting that the data in the buffer becomes empty;

stopping reading of the data from the buffer when it is detected that the data in the buffer becomes empty;

changing a frequency of the reference clock; and restarting the writing of the data into the buffer and the reading of the data from the buffer.

Therefore, the writing into the buffer is stopped when the sampling frequency is changed, and then the reference clock is changed into the reference clock that corresponds to the changed sampling frequency after the buffer becomes empty.

According to a eleventh aspect of the invention, there is provided a flow controlling method of a transmitting apparatus constructed to transmit reproduced data to a network, having the steps of:

detecting change of a reproduced track;

setting data reproduction to a pause state when the change of the reproduced track is detected;

detecting reception of a pause cancel signal; and canceling the pause state when the reception of the pause cancel signal is detected.

Therefore, the data reproduction is brought into the pause state every time when the track is changed, and then the pause state is canceled to restart the data reproduction when the pause cancel signal is received.

According to a twelfth aspect of the invention, there is provided a flow controlling method of a receiving apparatus having the steps of:

writing data received from a network into a buffer;

reading the data in the buffer based on a reference clock;

detecting a pause state on a transmitter side;

detecting change of a sampling frequency of the data when the pause state on the transmitter side is detected;

stopping writing of the data into the buffer when the change of the sampling frequency of the data is detected;

detecting that the data in the buffer becomes empty;

stopping reading of the data from the buffer when it is detected that the data in the buffer becomes empty;

changing a frequency of the reference clock;

controlling to restart the writing of the data into the buffer and the reading of the data from the buffer; and transmitting a pause cancel signal to the transmitter side.

Therefore, the pause state on the transmitter side is detected and then the writing into the buffer is stopped when the sampling frequency is changed. Then, after the buffer becomes empty, the reference clock is changed into the reference clock that corresponds to the changed sampling frequency and also the pause cancel signal to restart the operation on the transmitter side is transmitted.

According to a thirteenth aspect of the invention, there is provided a flow controlling method of a receiving apparatus having the steps of:

writing data received from a network into a buffer;

reading the data in the buffer based on a reference clock;

detecting change of a sampling frequency of the data;

controlling to stop writing of the data into the buffer when the change of the sampling frequency of the data is detected;

transmitting a pause signal to a transmitter side;

detecting that the data in the buffer becomes empty;

stopping reading of the data from the buffer when it is detected that the data in the buffer becomes empty;

changing a frequency of the reference clock;

restarting the writing of the data into the buffer and the reading of the data from the buffer; and transmitting a pause cancel signal to the transmitter side.

Therefore, when the sampling frequency is changed, the signal that brings the data reproduction into the pause state is transmitted to the transmitter side and also the writing into the buffer is stopped. Then, after the buffer becomes empty, the reference clock is changed into the reference clock that corresponds to the changed sampling frequency and also the pause cancel signal that restarts the operation on the transmitter side is transmitted.

According to a fourteenth aspect of the invention, there is provided a flow controlling method of a transmitting apparatus constructed to transmit reproduced data to a network, having the steps of:

detecting change of a sampling frequency of the data;

setting data reproduction to a pause state when the change of the sampling frequency of the data is detected;

detecting reception of a pause cancel signal; and canceling the pause state when the reception of the pause cancel signal is detected.

Therefore, the data reproduction is brought into the pause state every time when the sampling frequency is changed, and then the pause state is canceled to restart the data reproduction when the pause cancel signal is received.

According to a fifteenth aspect of the invention, there is provided a flow controlling method of a receiving apparatus having the steps of:

writing data received from a network into a buffer;

reading the data in the buffer based on a reference clock;

detecting change of a sampling frequency of the data;

stopping writing of the data into the buffer when the change of the sampling frequency of the data is detected;

detecting that the data in the buffer becomes empty;

stopping reading of the data from the buffer when it is detected that the data in the buffer becomes empty;

changing a frequency of the reference clock;

restarting the writing of the data into the buffer and the reading of the data from the buffer; and transmitting a pause cancel signal to a transmitter side.

Therefore, when the change of the sampling frequency is detected, the writing into the buffer is stopped. Then, after the buffer becomes empty, the reference clock is changed into the reference clock that corresponds to the changed sampling frequency and also the pause cancel signal to restart the operation on the transmitter side is transmitted.

According to a sixteenth aspect of the invention, there is provided a flow controlling method of a receiving apparatus having the steps of:

writing data received from a network into a plurality of buffers;

reading the data in the buffers based on a plurality of reference clocks;

detecting change of a sampling frequency of the data;

stopping writing of the data into one buffer when the change of a sampling frequency of the data is detected;

changing a frequency of a first reference clock;

starting the writing of the data into other buffer;

detecting that the data in the one buffer becomes empty;

controlling to stop the reading of the data from the one buffer when it is detected that the data in the one buffer becomes empty;

changing a frequency of a second reference clock; and starting the reading of the data from the other buffer.

Therefore, when the sampling frequency is changed, the reading of the data, which is obtained before the change, from one buffer is still continued and also the data, which is obtained after the change, is written into the other buffer after the reference clock on the writing side is changed. Then, the reference clock on the reading side is changed as soon as the data in one buffer is out, and then the buffer to be read is switched into the other buffer.

BRIEF DESCRIPTION OF THE DRAWINGS

Exemplary embodiments are described below based on the drawings, in which like numerals represent like parts, and wherein.

DETAILED DESCRIPTION OF THE PREFERRED EMBODIMENTS

Embodiments according to the present invention will be explained in detail with reference to the drawings hereinafter.

(First Embodiment)

A first embodiment according to the present invention will be explained hereunder.

Figure 1:
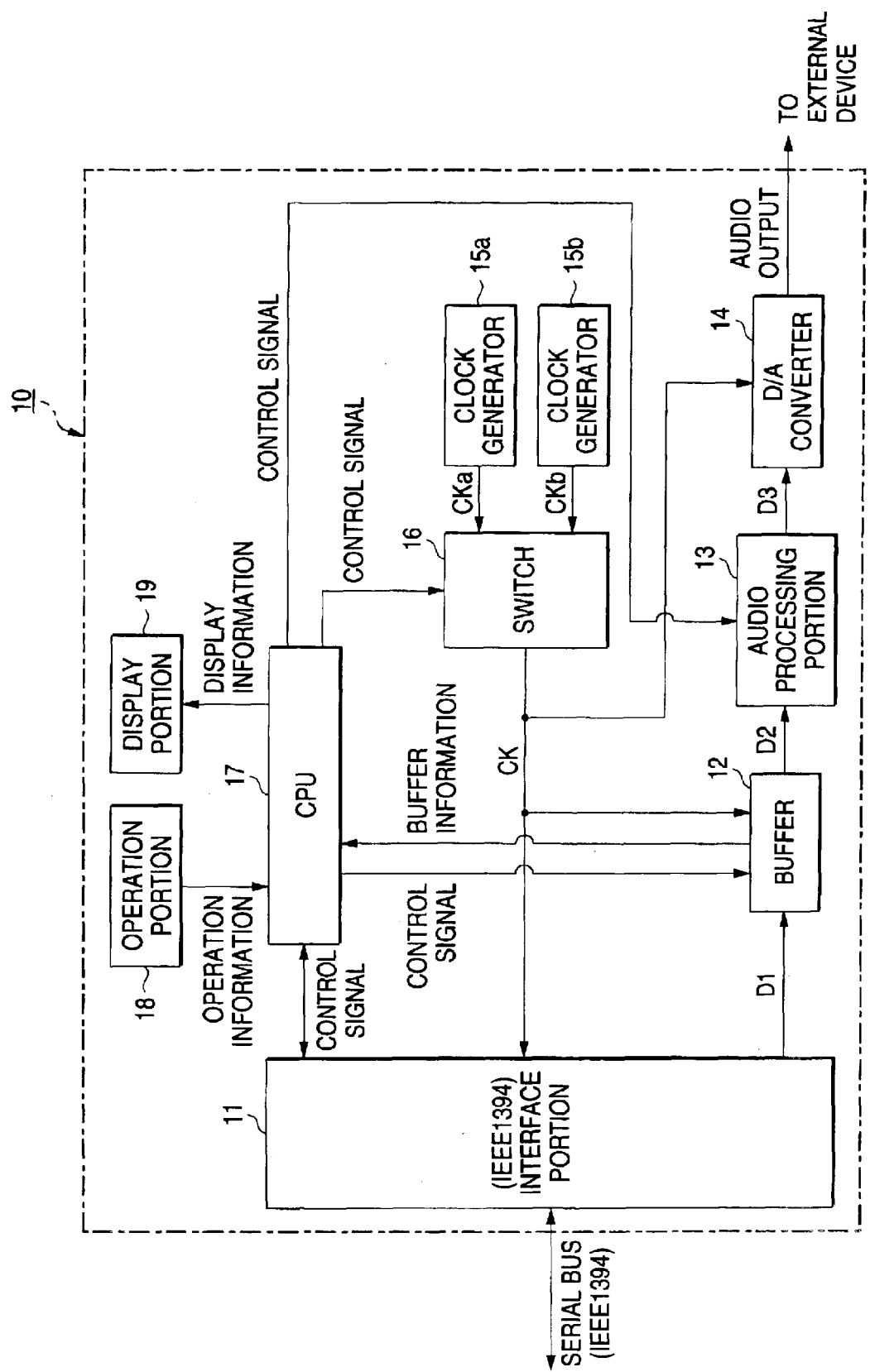
FIG. 1 is a block diagram showing a configuration of a receiving apparatus (amplifier) according to first to fifth embodiments.

FIG. 1 is a block diagram showing a configuration of a receiving apparatus (amplifier) according to first to fifth embodiments.

As shown in FIG. 1, the receiving apparatus (amplifier) 10 according to the first embodiment has an I/F portion 11, a buffer 12, an audio processing portion 13, a DA converter 14, reference clock generators 15a, 15b, a reference clock changing switch 16, a CPU 17, an operation portion 18, and a display portion 19.

Next, connections and configurations of respective blocks of the receiving apparatus (amplifier) 10 will be explained hereunder.

As shown in FIG. 1, the I/F portion 11 is connected to a serial bus based on the IEEE 1394 standard and connected to the network. Also, the I/F portion 11 is connected to input/output the control signal into/from the CPU 17, and also is connected to output the audio data D1 to the buffer 12.

The buffer 12 is connected to output the audio data D2 to the audio controlling portion 13, and also is connected to output the buffer information to the CPU 17 and to receive the buffer control signal from the CPU 17.

The audio controlling portion 13 is connected to output the audio data D3 to the DA converter 14, and also is connected to input/output the control signal into/from the CPU 17.

The DA converter 14 is constructed such that the converter can connect the DA-converted audio signal to an external device (e.g., the loudspeaker), etc.

The reference clock generators 15a, 15b are constructed to generate reference clocks CKa, CKb having different FSs (Sampling Frequencies), respectively.

The reference clock changing switch 16 is constructed such that the switch can receive the reference clock CKa supplied from the reference clock generator 15a, the reference clock CKb supplied from the reference clock generator 15b, and the reference clock change control signal output from the CPU 17 and then can supply the changed reference clock CK to respective blocks (the I/F portion 11, the buffer 12, and the DA converter 14) in the receiving apparatus (amplifier) 10.

The CPU 17 is connected to receive the operation information, which is used to operate the receiving apparatus (amplifier) 10 from the outside, from the operation portion 18 and to output the display information to the display portion 19 that displays internal information to the outside, respectively.

Also, the CPU 17 is constructed to control respective blocks in the receiving apparatus (amplifier) 10. More particularly, the CPU 17 is constructed to input/output the control signal into/from the I/F portion 11, to input the buffer information from the buffer 12, to output the change control signal to the reference clock changing switch 16, and to output the control signal to the audio controlling portion 13.

Next, a configuration of a transmitting apparatus (DVD player) will be explained hereunder.

Figure 2:
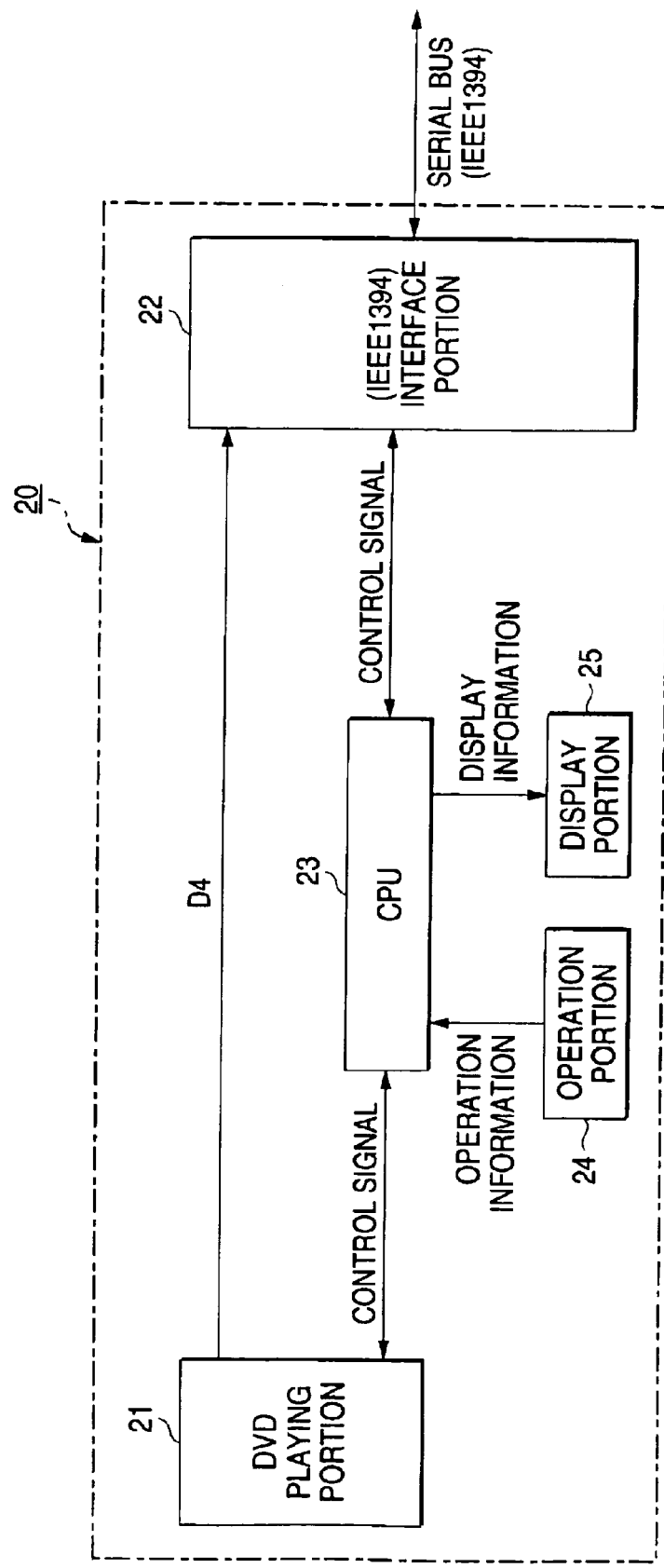
FIG. 2 is a block diagram showing a configuration of a transmitting apparatus (DVD player) according to first to sixth embodiments.

FIG. 2 is a block diagram showing a configuration of the transmitting apparatus (DVD player).

As shown in FIG. 2, the transmitting apparatus (DVD player) 20 has a DVD playing portion 21, an I/F portion 22 based on the IEEE 1394 standard, a CPU 23, an operation portion 24, and a display portion 25.

Then, connections and configurations of respective blocks of the transmitting apparatus (DVD player) 20 will be explained hereunder.

As shown in FIG. 2, the DVD playing portion 21 is connected to output the reproduced audio data D4 to the I/F portion 22 and to input/output the control signal into/from the CPU 23.

The I/F portion 22 is connected to the serial bus based on the IEEE 1394 standard and connected to the network. This I/F portion 22 is connected to input/output the control signal into/from the CPU 23 and also connected to receive the audio data D4.

The CPU 23 is connected to receive the operation information, which is used to operate the transmitting apparatus (DVD player) 20 from the outside, from the operation portion 24 and to output the display information to the display portion 25 that displays the internal information to the outside, respectively.

Also, the CPU 23 is constructed to control respective blocks in the transmitting apparatus (DVD player) 20 and to input/output the control signal into/from the DVD playing portion 21 and the I/F portion 22.

The present embodiment is the receiving apparatus (amplifier) 10 that is constructed to store the audio data received from the network into the buffer and to read the audio data stored in the buffer 12 based on the reference clock. The audio data is the data that is transmitted from the transmitting apparatus (DVD player) 20, for example.

The feature of the receiving apparatus (amplifier) 10 according to the present embodiment is that a plurality of functions for executing a flow control by transmitting the control signal from the CPU 17 are provided. These functions are given as follows.

(1) a detecting function for detecting change of a sampling frequency of the audio data D1, (2) a first controlling function for controlling to stop the writing of the audio data D1 into the buffer 12 and the reading of the audio data D2 from the buffer 12, in response to an output of the detecting function, (3) a clearing function for clearing the data in the buffer 12 in response to the output of the detecting function, (4) a reference clock changing function for changing the frequency of the reference clock CK in response to the output of the detecting function, and (5) a second controlling function for controlling to restart the writing of the audio data D1 into the buffer 12 and the reading of the audio data D2 from the buffer 12, in response to the output of the detecting function.

Then, a flow controlling method of the receiving apparatus according to the first embodiment will be explained with reference to FIG. 3 hereunder.

Figure 3:
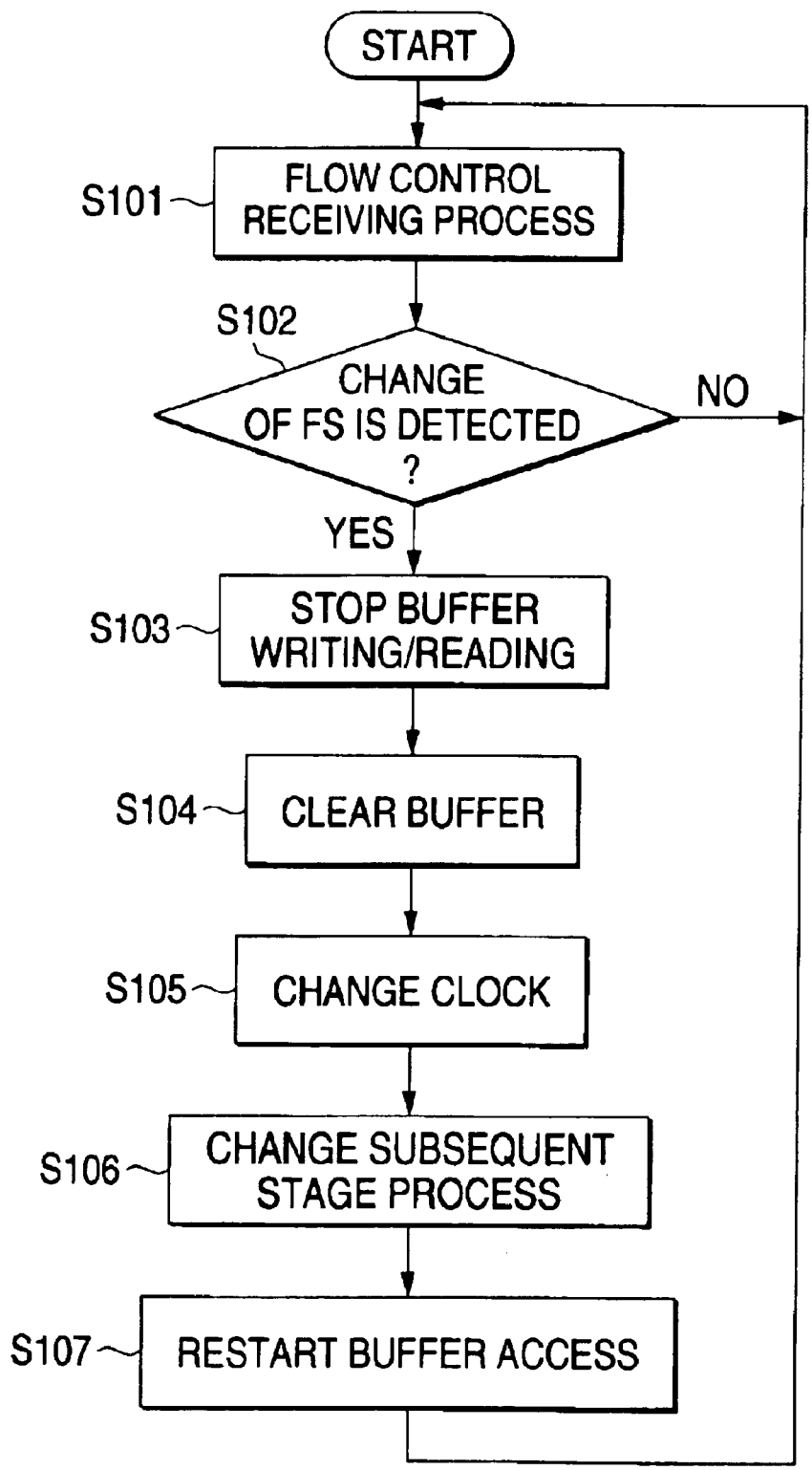
FIG. 3 is a flowchart showing a flow controlling method of the receiving apparatus according to the first embodiment.

First, as shown in FIG. 3, the receiving apparatus (amplifier) 10 executes a flow control receiving process (step S101).

Then, the process of deciding whether or not the FS is changed is executed. The process in step S103 is executed if the change of FS is detected (Yes), while the process returns to the flow control receiving process in step S101 unless the change of FS is detected (No) (step S102).

Then, the buffer stop control signal is sent from the CPU 17 to the buffer 12 to stop the writing of the audio data D1 into the buffer 12 and the reading of the audio data D2 from the buffer 12 (step S103).

Then, the clear control signal is sent from the CPU 17 to the buffer 12 to clear the data stored in the buffer 12 (step S104).

Then, the changing control signal is sent from the CPU 17 to the reference clock changing switch 16 to change the reference clock (step S105).

Then, the audio control signal is sent out from the CPU 17 to the audio processing portion 13 to change the process of the audio signal being output to the outside (step S106).

Then, the restart control signal is sent out from the CPU 17 to the buffer 12 to restart the buffer access (writing/reading) (step S107), and then the process goes back to the flow control receiving process in step S101.

(Second Embodiment)

A second embodiment according to the present invention will be explained hereunder.

A configuration of the receiving apparatus (amplifier) 10 according to the second embodiment is similar to that of the first embodiment, and a configuration of the transmitting apparatus (DVD player) 20 is also similar to that of the first embodiment.

The present embodiment is the receiving apparatus (amplifier) 10 that is constructed to store the audio data D1 received from the network into the buffer and to read the data stored in the buffer 12 based on the reference clock. The audio data D1 is the data that is transmitted from the transmitting apparatus (DVD player) 20, for example.

The feature of the receiving apparatus (amplifier) 10 according to the present embodiment is that a plurality of functions for executing a flow control by transmitting the control signal from the CPU 17 are provided. These functions are given as follows.

(1) a first detecting function for detecting change of the sampling frequency of the audio data D1, (2) a first controlling function for controlling to stop the writing of the audio data D1 into the buffer 12 in response to an output of the first detecting function, (3) a second detecting function for detecting that the data in the buffer 12 becomes empty, (4) a second controlling function for controlling to stop the reading of the audio data D2 from the buffer 12 in response to the output of the second detecting function, (5) a reference clock changing function for changing the frequency of the reference clock CK in response to the output of the second detecting function, and (6) a third controlling function for controlling to restart the writing of the audio data D1 into the buffer 12 and the reading of the audio data D2 from the buffer 12, in response to the output of the second detecting function.

Then, a flow controlling method of the receiving apparatus according to the second embodiment will be explained with reference to FIG. 4 hereunder.

Figure 4:
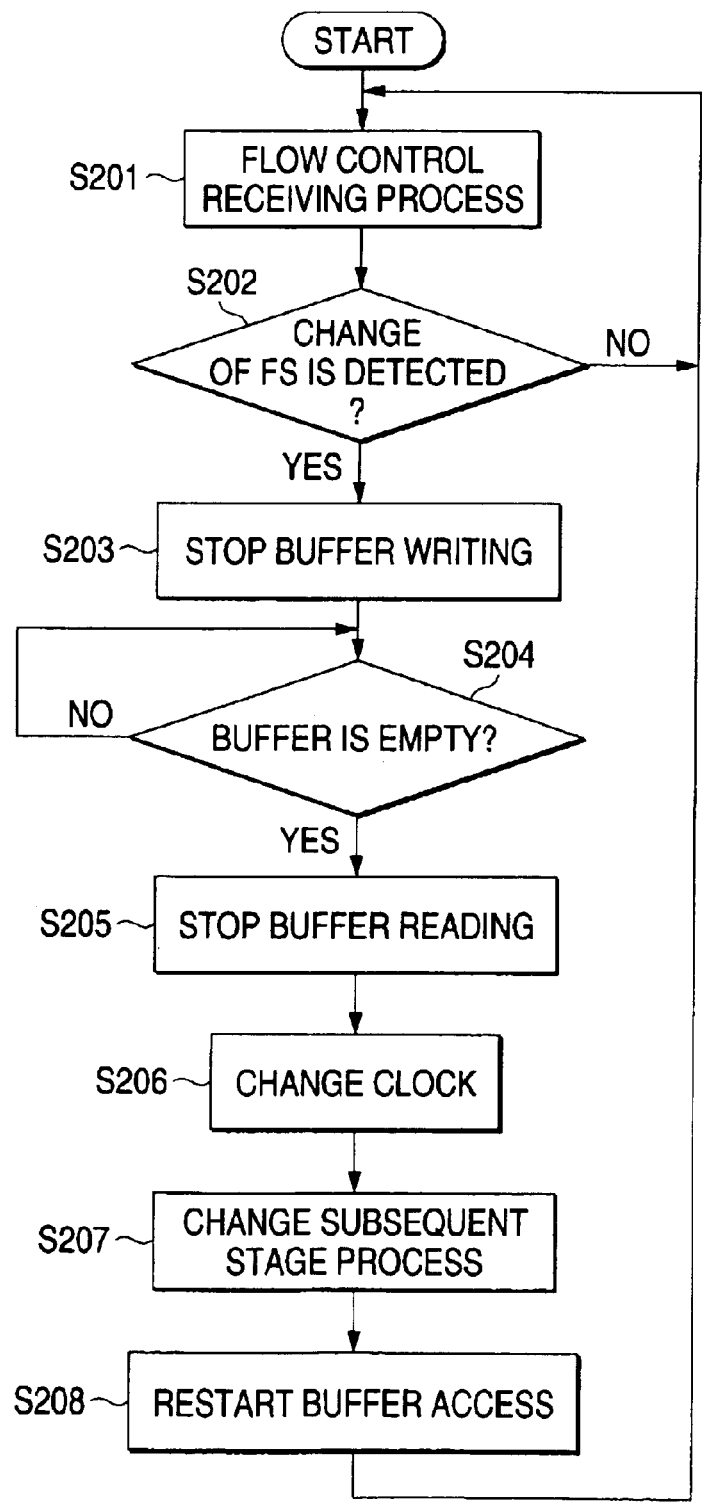
FIG. 4 is a flowchart showing a flow controlling method of the receiving apparatus according to the second embodiment.

First, as shown in FIG. 4, the receiving apparatus (amplifier) 10 executes the flow control receiving process (step S201).

Then, the process of detecting whether or not FS is changed is carried out (step S202). Then, the process in step S203 is carried out if the change of FS is detected (Yes) whereas the process returns to the flow control receiving process in step S201 unless the change of FS is detected (No).

Then, the writing of the audio data D1 into the buffer 12 is stopped by sending the writing stop control signal from the CPU 17 to the buffer 12 (step S203).

Then, it is detected whether or not the buffer 12 is empty (step S204). Then, the process in step S205 is carried out if it is detected that the buffer 12 is empty (Yes), while the detection to decide whether or not the buffer 12 is empty is repeated unless it is detected that the buffer 12 is empty (No).

Then, the reading of the audio data D2 from the buffer 12 is stopped by sending the reading stop control signal from the CPU 17 to the buffer 12 (step S205).

Then, the reference clock is changed by transmitting the reference clock change control signal from the CPU 17 to the reference clock changing switch 16 (step S206).

Then, the process of the audio signal that is output to the outside is changed by sending the control signal from the CPU 17 to the audio controlling portion 13 (step S207).

Then, the buffer access (writing/reading) is restarted by sending the restart control signal from the CPU 17 to the buffer 12 (step S208). Then, the process goes back to the flow control receiving process in step S201.

(Third Embodiment)

A third embodiment according to the present invention will be explained hereunder.

A configuration of the receiving apparatus (amplifier) 10 according to the third embodiment is similar to that of the first embodiment, and the same is true of a configuration of the transmitting apparatus (DVD player) 20.

Timings of the control signals and the data between the transmitting apparatus and the receiving apparatus will be explained with reference to FIG. 5 hereunder.

Figure 5:
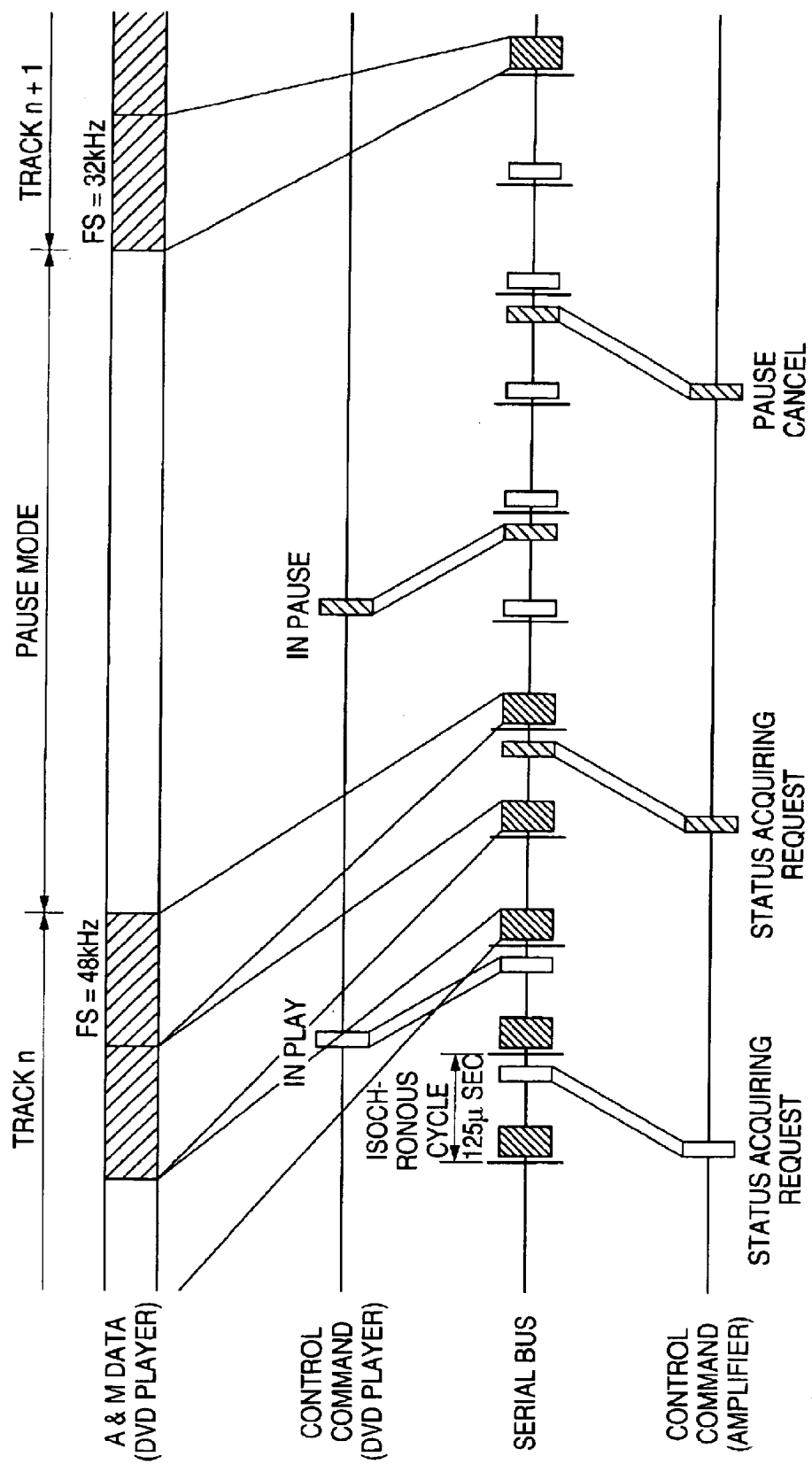
FIG. 5 is a view showing timings of control signals and data between the transmitting apparatus and the receiving apparatus according to the third embodiment.

As shown in FIG. 5, when the track is changed from the track n to the track n+1, FS=48 kHz applied to the A&M (IEEE 1394 audio transmission standard) data, which are sent out from the transmitting apparatus (DVD player) 20, is changed to FS=32 kHz via the pause mode.

First, the A&M data having FS=48 kHz on the track n is stored in the isochronous cycle, which is the synchronization unit on the serial bus that has a length of 125 $\mu$sec.

The transmitting apparatus (DVD player) 20 changes the value of the associated information FDF (Format Dependent Field), which are associated with the audio data such as the sampling frequency, etc. in the A&M data, from 2 (indicating FS: 48 kHz) to 0 (indicating FS: 32 kHz), and then enters into the pause mode. The receiving apparatus (amplifier) 10 stores the status acquiring request command in the asynchronous transmission area and also sends out the status acquiring request to the transmitting apparatus at the constant interval. The transmitting apparatus, which has received the status acquiring request command, sends out the signal indicating the apparatus is in pause. When the receiving apparatus (amplifier) 10, which receives this signal, checks the value of the associated information FDF in the received audio data to confirm that FS has been changed, such apparatus 10 sends out the pause cancel command to the transmitting apparatus (DVD player) 20.

Then, the transmitting apparatus (DVD player) 20, which has received the pause cancel command, cancels the pause and sends out the A&M data having FS=32 kHz on the track n+1.

The present embodiment is the transmitting apparatus (DVD player) 20 constructed to transmit the reproduced audio data to the network and the receiving apparatus (amplifier) 10 constructed to store the audio data received from the network in the buffer and also read the data in the buffer based on the reference clock.

The feature of the transmitting apparatus (DVD player) 20 according to the present embodiment is that a plurality of functions for executing a flow control by transmitting the control signal from the CPU 23 are provided. These functions are given as follows.

(1) A first detecting function for detecting change of the reproduced track, (2) a first controlling function for setting the data reproduction to the pause state in response to an output of the first detecting function, (3) a second detecting function for detecting the reception of the pause cancel signal, and (4) a second controlling function for canceling the pause state in response to an output of the second detecting function.

The feature of the receiving apparatus (amplifier) 10 according to the present embodiment is that a plurality of functions for executing a flow control by transmitting the control signal from the CPU 17 are provided. These functions are given as follows.

(1) A first detecting function for detecting the pause state on a transmitter side, (2) a second detecting function for detecting change of the sampling frequency of the audio data D1 in response to an output of the first detecting function, (3) a first controlling function for controlling to stop the writing of the audio data D1 into the buffer 12 in response to an output of the second detecting function, (4) a third detecting function for detecting that the data in the buffer 12 becomes empty, and a second controlling function for controlling to stop the reading of the audio data D2 from the buffer 12 in response to an output of the third detecting function, (5) a reference clock changing function for changing the frequency of the reference clock in response to the output of the third detecting function, (6) a third controlling function for controlling to restart the writing of the data into the buffer and the reading of the data from the buffer, and (7) a control signal transmitting function for transmitting a pause cancel signal to the transmitter side.

Flow controlling methods of the transmitting apparatus and the receiving apparatus according to the third embodiment will be explained with reference to FIG. 6 hereunder.

Figure 6:
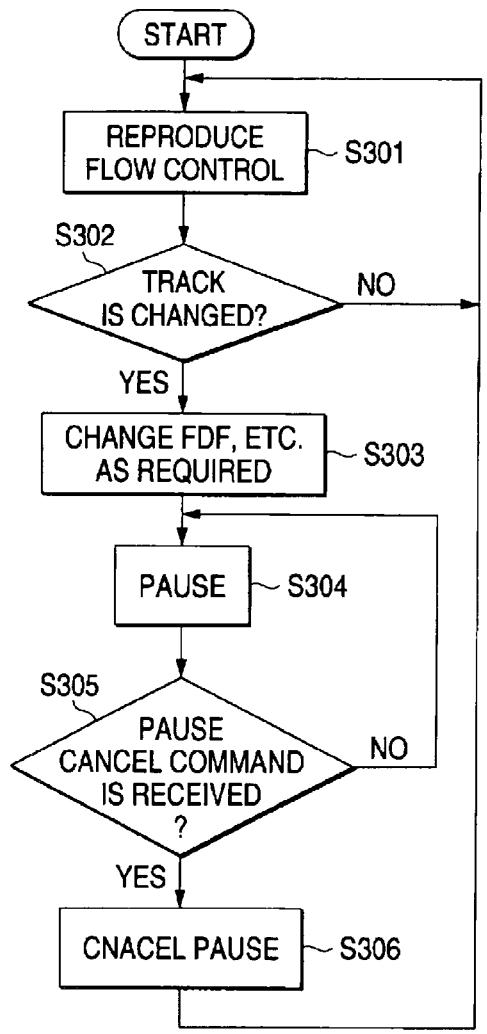
FIGS. 6(A) and 6(B) are flowcharts showing flow controlling methods of the transmitting apparatus and the receiving apparatus according to the third embodiment
Figure 6:
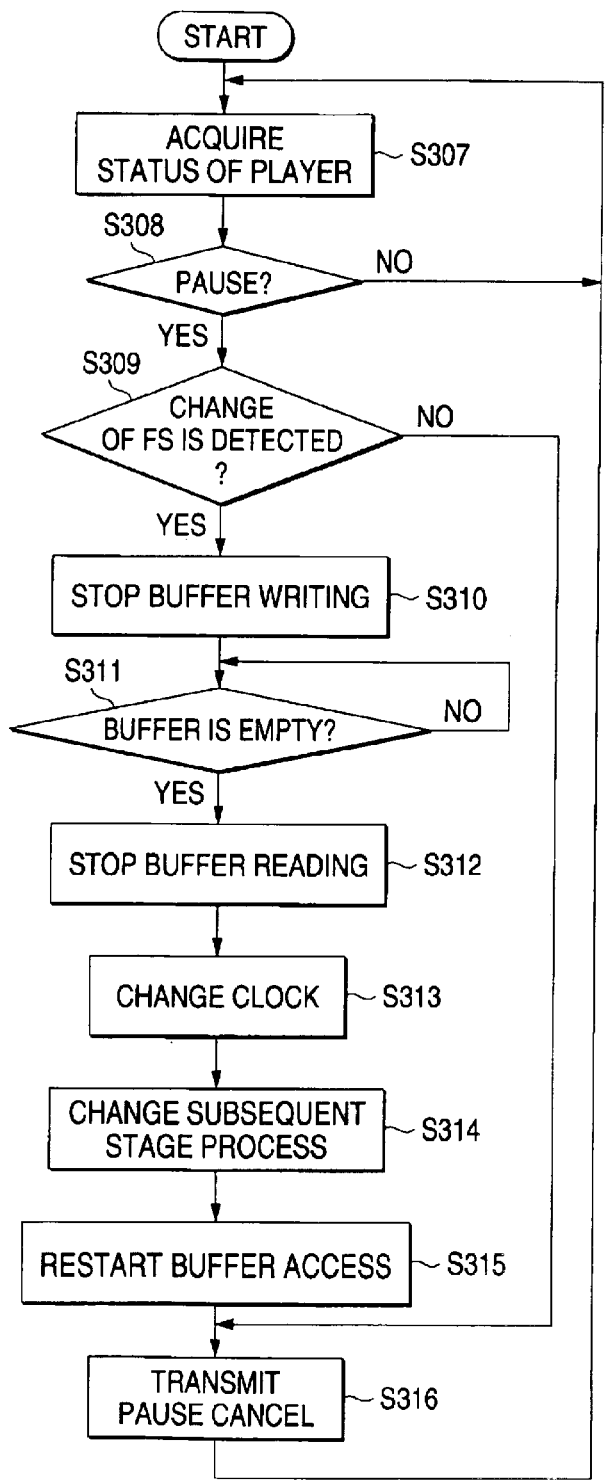

In FIG. 6, steps S301 to S306 show a flow control method on the transmitting apparatus side, and steps S307 to S316 show a flow control method on the receiving apparatus side.

A flow controlling method on the transmitting apparatus (DVD player) 20 side will be explained hereunder.

The transmitting apparatus (DVD player) 20 is carrying out a flow control reproduction (step S301).

Then, the process of detecting whether or not the track is changed is carried out (step S302). Then, the process in step S303 is carried out if the track change is detected (Yes) whereas the process returns to the flow control reproducing process in step S301 unless the track change is detected (No) Then, the associated information FDF, etc. to be transmitted are changed as required (step S303).

Then, the DVD playing portion 21 is set in the pause mode (step S304).

Then, the process of detecting whether or not the pause cancel command is received is carried out (step S305). Then, the process in step S306 is carried out if the pause cancel command is received (Yes), while the pause mode in step S304 is maintained unless the pause cancel command is received (No).

Then, the pause mode of the DVD playing portion 21 is cancelled (step S306). Then, the process goes back to the flow control reproduction in step S301.

Next, a flow controlling method on the receiving apparatus (amplifier) side will be explained hereunder.

First, the status of the transmitting apparatus (DVD player) 20 is acquired (step S307).

Then, the process of detecting whether or not the transmitting apparatus (DVD player) 20 is in the pause mode (step S308). Then, the process in step S309 is carried out if the transmitting apparatus 20 is in the pause mode (Yes) whereas the process returns to step S307 unless the transmitting apparatus 20 is in the pause mode (No).

Then, the process of detecting whether or not the FS is changed is carried out (step S309). Then, the process in step S310 is carried out if the change of the FS is detected (Yes), while the process in step S316 (the transmission of the pause cancel command) is carried out unless the change of the FS is detected (No).

Then, the writing of the audio data D1 into the buffer 12 is stopped by supplying the writing stop control signal from the CPU 17 to the buffer 12 (step S310).

Then, it is detected whether or not the buffer 12 is empty (step S311). Then, the process in step S312 is carried out if it is detected that the buffer 12 is empty (Yes) whereas the process of detecting whether or not the buffer 12 is empty is repeated if it is not detected that the buffer 12 is empty (No).

Then, the reading of the audio data D2 from the buffer 12 is stopped by supplying the reading stop control signal from the CPU 17 to the buffer 12 (step S312).

Then, the reference clock is changed by supplying the reference clock changing control signal from the CPU 17 to the reference clock changing switch 16 (step S313).

Then, the process of the audio signal to be output to the outside is changed by sending the audio control signal from the CPU 17 to the audio controlling portion 13 (step S314).

Then, the buffer access (writing/reading) is restarted by supplying the restart control signal from the CPU 17 to the buffer 12 (step S315).

Then, the pause cancel command is transmitted to the transmitting apparatus (DVD player) 20 (step S316). Then, the process goes back to step S307.

(Fourth Embodiment)

A fourth embodiment according to the present invention will be explained hereunder.

A configuration of the receiving apparatus (amplifier) 10 according to the fourth embodiment is similar to that of the first embodiment, and the same is true of a configuration of the transmitting apparatus (DVD player) 20.

The present embodiment is the receiving apparatus (amplifier) 10 that is constructed to store the audio data received from the network into the buffer and to read the data stored in the buffer based on the reference clock. The audio data is the data that is transmitted from the transmitting apparatus (DVD player) 20, for example.

The feature of the receiving apparatus (amplifier) 10 according to the present embodiment is that a plurality of functions for executing a flow control by transmitting the control signal from the CPU 17 are provided. These functions are given as follows.

(1) A first detecting function for detecting change of the sampling frequency of the audio data D1, (2) a first controlling function for controlling to stop the writing of the audio data D1 into the buffer 12 in response to an output of the first detecting function, (3) a first control signal transmitting function for transmitting a pause signal to the transmitter side, (4) a second detecting function for detecting that the data in the buffer 12 becomes empty, and a second controlling function for controlling to stop the reading of the audio data D2 from the buffer 12 in response to an output of the second detecting function, (5) a reference clock changing function for changing the frequency of the reference clock CK in response to the output of the second detecting function, (6) a third controlling function for controlling to restart the writing of the audio data D1 into the buffer 12 and the reading of the audio data D2 from the buffer 12 in response to the output of the second detecting function, and (7) a second control signal transmitting function for transmitting a pause cancel signal to the transmitter side in response to the output of the second detecting function.

Then, a flow controlling method of the receiving apparatus according to the fourth embodiment will be explained with reference to FIG. 7 hereunder.

Figure 7:
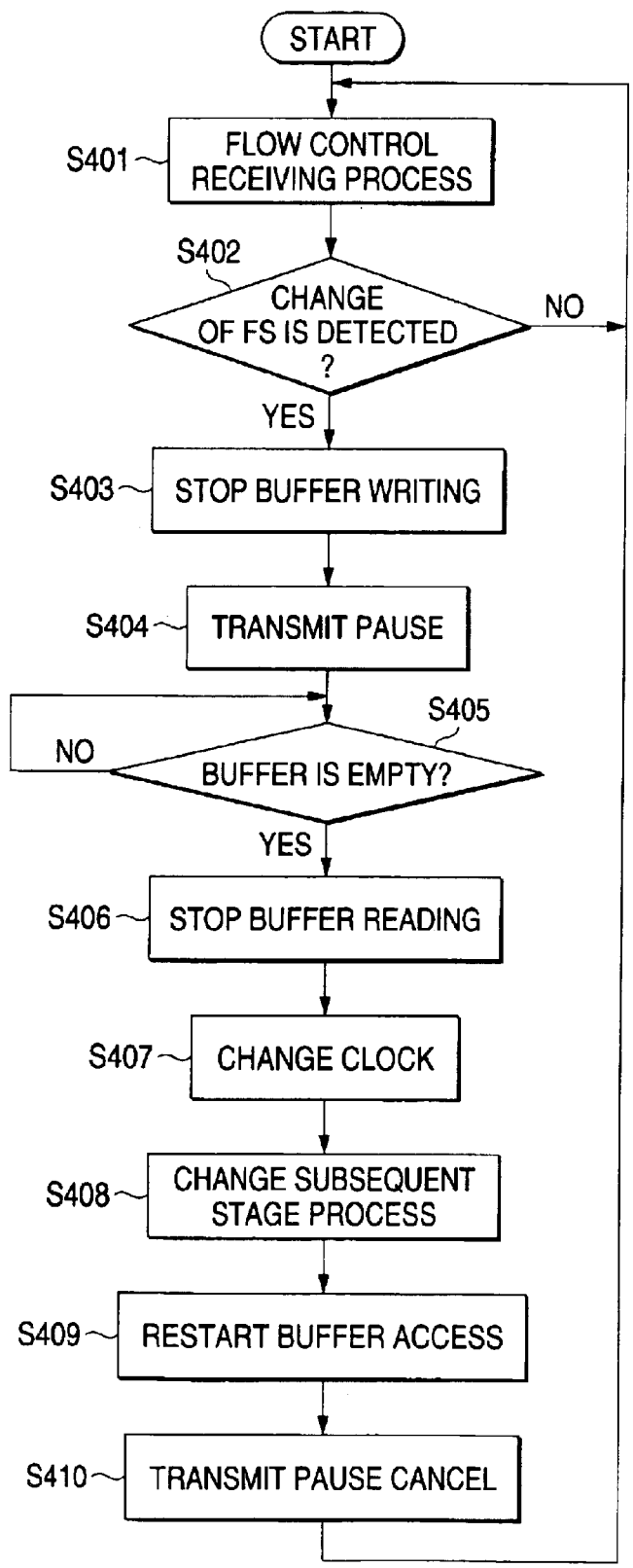
FIG. 7 is a flowchart showing a flow controlling method of the receiving apparatus according to the fourth embodiment.

First, as shown in FIG. 7, the receiving apparatus (amplifier) 10 executes a flow control receiving process (step S401).

Then, the process of detecting whether or not the FS is changed is carried out (step S402). Then, the process in step S403 is carried out if the change of the FS is detected (Yes), while the process goes back to the flow control receiving process in step S401 unless the change of the FS is detected (No).

Then, the writing of the audio data D1 into the buffer 12 is stopped by supplying the writing stop control signal from the CPU 17 to the buffer 12 (step S403).

Then, the transmitting apparatus (DVD player) 20 is set in the pause mode by transmitting the pause command to the transmitting apparatus (DVD player) 20 (S404).

Then, it is detected whether or not the buffer 12 is empty (step S405). Then, the process in step S406 is carried out if it is detected that the buffer 12 is empty (Yes) whereas the process of detecting whether or not the buffer 12 is empty is repeated if it is not detected that the buffer 12 is empty (No).

Then, the reading of the audio data D2 from the buffer 12 is stopped by supplying the reading stop control signal from the CPU 17 to the buffer 12 (step S406).

Then, the reference clock is changed by supplying the reference clock changing control signal from the CPU 17 to the reference clock changing switch 16 (step S407).

Then, the process of the audio signal to be output to the outside is changed by supplying the audio control signal from the CPU 17 to the audio controlling portion 13 (step S408).

Then, the buffer access (writing/reading) is restarted by supplying the restart control signal from the CPU 17 to the buffer 12 (step S409).

Then, the pause cancel command is transmitted to the transmitting apparatus (DVD player) 20 (step S410) Then, the process goes back to step S401.

(Fifth Embodiment)

A fifth embodiment according to the present invention will be explained hereunder.

A configuration of the receiving apparatus (amplifier) 10 according to the fifth embodiment is similar to that of the first embodiment, and the same is true of a configuration of the transmitting apparatus (DVD player) 20.

The present embodiment is the transmitting apparatus (DVD player) 20 that is constructed to transmit the reproduced data to the network and the receiving apparatus (amplifier) 10 that is constructed to store the audio data received from the network into the buffer and to read the data stored in the buffer based on the reference clock.

The feature of the transmitting apparatus (DVD player) 20 according to the present embodiment is that a plurality of functions for executing a flow control by transmitting the control signal from the CPU 23 are provided. These functions are given as follows.

(1) A first detecting function for detecting change of the sampling frequency of the audio data D4, (2) a first controlling function for setting the audio data reproduction in the pause state in response to an output of the first detecting function, (3) a second detecting function for detecting the reception of the pause cancel signal, and (4) a second controlling function for canceling the pause state in response to an output of the second detecting function.

The feature of the receiving apparatus (amplifier) 10 according to the present embodiment is that a plurality of functions for executing a flow control by transmitting the control signal from the CPU 17 are provided. These functions are given as follows.

(1) A first detecting function for detecting change of the sampling frequency of the audio data D1, (2) a first controlling function for controlling to stop the writing of the audio data D1 in the buffer 12 in response to an output of the first detecting function, (3) a second detecting function for detecting that the data in the buffer 12 becomes empty, (4) a second controlling function for controlling to stop the reading of the audio data D2 from the buffer 12 in response to an output of the second detecting function, (5) a reference clock changing function for changing the frequency of the reference clock CK in response to the output of the second detecting function, (6) a third controlling function for controlling to restart the writing of the audio data D1 into the buffer 12 and the reading of the audio data D2 from the buffer 12, in response to the output of the second detecting function, and (7) a control signal transmitting function for transmitting a pause cancel signal to the transmitter side.

Then, flow controlling methods of the transmitting apparatus and the receiving apparatus according to the fifth embodiment will be explained with reference to FIG. 8 hereunder.

Figure 8:
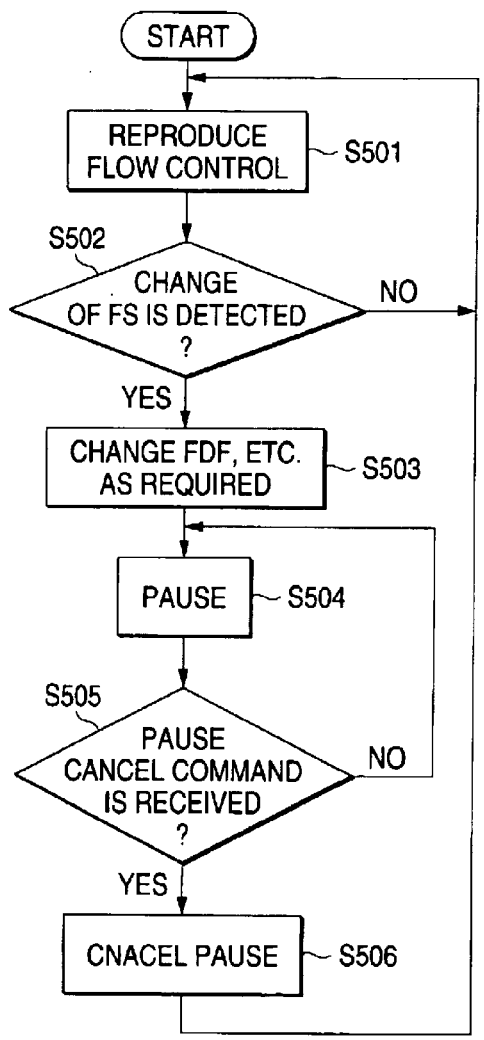
FIGS 8(A) and 8(B) are flowcharts showing flow controlling methods of the transmitting apparatus and the receiving apparatus according to the fifth embodiment.
Figure 8:
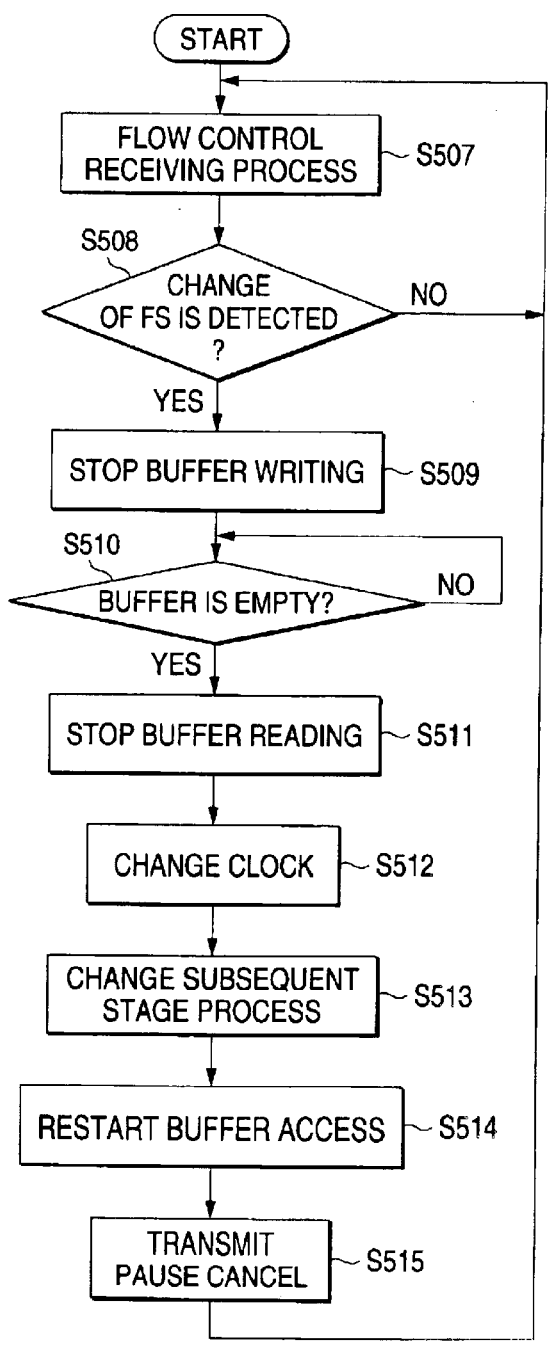

In FIG. 8, steps S501 to S506 show a flow control method on the transmitting apparatus (DVD player) side, and steps S507 to S515 show a flow control method on the receiving apparatus (amplifier) side.

A flow controlling method on the transmitting apparatus (DVD player) 20 side will be explained hereunder.

The transmitting apparatus (DVD player) 20 is carrying out a flow control reproduction (step S501).

Then, the process of detecting whether or not the FS is changed is carried out (step S502). Then, the process in step S503 is carried out if the FS change is detected (Yes) whereas the process goes back to the flow control reproducing process in step S501 unless the FS change is detected (No).

Then, the associated information FDF, etc. of the audio data to be transmitted are changed as required (step S503).

Then, the DVD playing portion 21 is set in the pause mode (step S504).

Then, the process of detecting whether or not the pause cancel command is received is carried out (step S505). Then, the process in step S506 is carried out if the pause cancel command is received (Yes), while the pause mode in step S504 is maintained unless the pause cancel command is received (No)

Then, the pause mode of the DVD playing portion 21 is cancelled (step S506). Then, the process goes back to the flow control reproduction in step S501.

A flow control method on the receiving apparatus (amplifier) side will be explained hereunder.

As shown in FIG. 8, the receiving apparatus (amplifier) 10 executes the flow control receiving process (S507).

Then, the process of detecting whether or not the FS is changed is carried out (step S508). Then, the process in step S509 is carried out if the change of the FS is detected (Yes), while the process goes back to step S507 unless the change of the FS is detected (No).

Then, the writing of the audio data D1 into the buffer 12 is stopped by supplying the writing stop control signal from the CPU 17 to the buffer 12 (step S509).

Then, it is detected whether or not the buffer 12 is empty (step S510). Then, the process in step S511 is carried out if it is detected that the buffer 12 is empty (Yes) whereas the process of detecting whether or not the buffer 12 is empty is repeated if it is not detected that the buffer 12 is empty (No).

Then, the reading of the audio data D2 from the buffer 12 is stopped by supplying the reading stop control signal from the CPU 17 to the buffer 12 (step S511).

Then, the reference clock is changed by supplying the reference clock changing control signal from the CPU 17 to the reference clock changing switch 16 (step S512).

Then, the process of the audio signal to be output to the outside is changed by sending the audio control signal from the CPU 17 to the audio controlling portion 13 (step S513).

Then, the buffer access (writing/reading) is restarted by supplying the restart control signal from the CPU 17 to the buffer 12 (step S514).

Then, the pause cancel command is transmitted to the transmitting apparatus (DVD player) 20 (step S515). Then, the process goes back to step S507.

(Sixth Embodiment)

A sixth embodiment according to the present invention will be explained hereunder.

Figure 9:
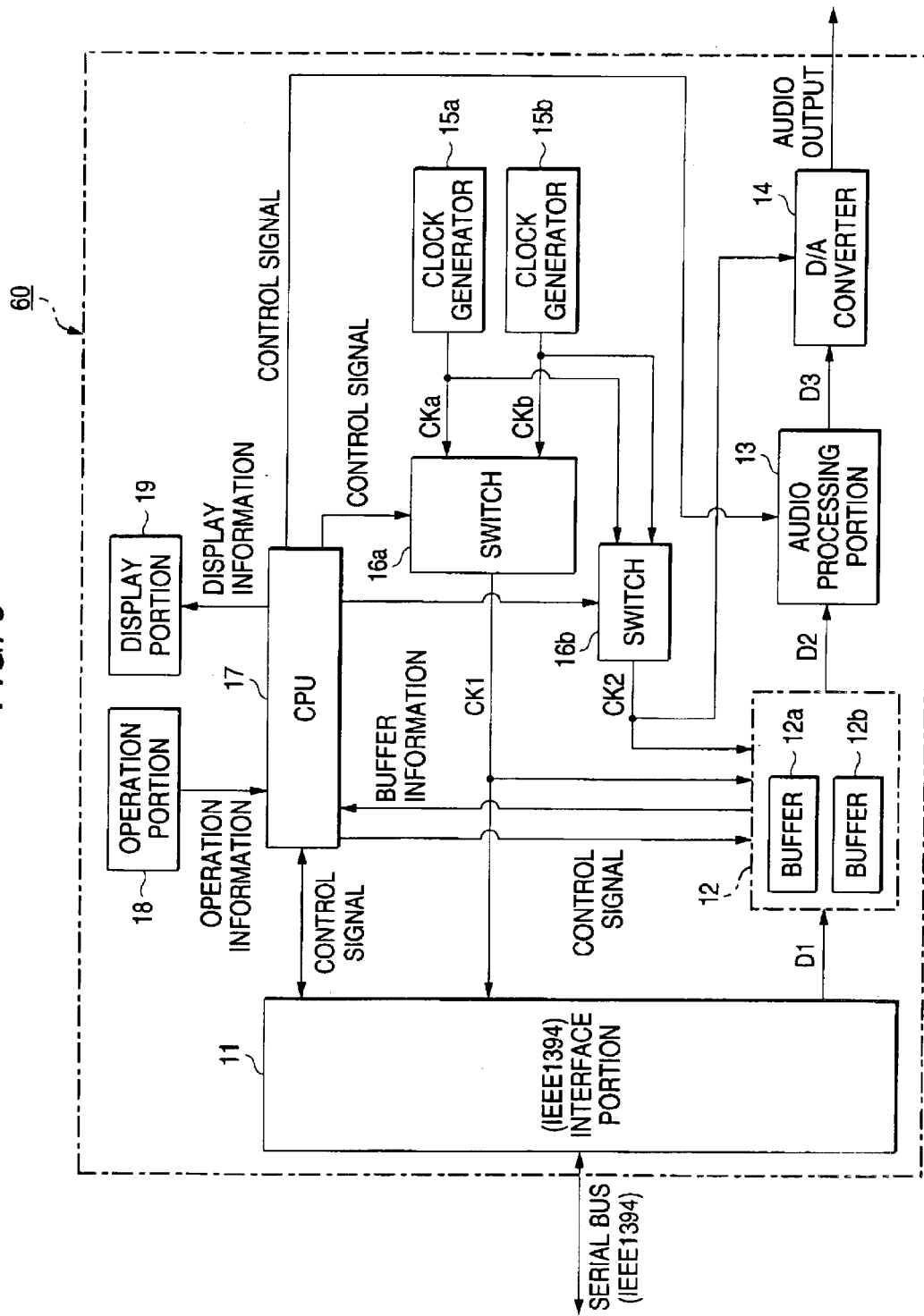
FIG. 9 is a block diagram showing a configuration of a receiving apparatus (amplifier) according to a sixth embodiment.

FIG. 9 is a block diagram showing a configuration of a receiving apparatus (amplifier) according to the sixth embodiment.

Differences of the receiving apparatus (amplifier) 60 according to the sixth embodiment shown in FIG. 9 from the first embodiment in configuration are the buffer 12 and the reference clock changing switch 16. In the sixth embodiment, the buffer 12 has a buffer 12a and a buffer 12b and the reference clock changing switch 16 has two reference clock changing switches 16a, 16b.

Accordingly, a configuration for supplying the reference clock becomes different. The reference clock changing switch 16a is constructed to receive the reference clock CKa supplied from a reference clock generator 15a, the reference clock CKb supplied from a reference clock generator 15b, and the reference clock changing control signal output from the CPU 17 and also to supply the changed reference clock CK1 to the I/F portion 11 and the buffer 12.

Also, the reference clock changing switch 16b is constructed to receive the reference clock CKa supplied from a reference clock generator 15a, the reference clock CKb supplied from a reference clock generator 15b, and the reference clock changing control signal output from the CPU 17 and also to supply the changed reference clock CK2 to the buffer 12 and the DA converter 14.

The configurations other than above configurations are the same as the first embodiment, and the same is true of a configuration of the transmitting apparatus (DVD player) 20.

The present embodiment is the receiving apparatus (amplifier) 60 that is constructed to store the audio data received from the network into the buffer and to read the data stored in the buffer based on the reference clock. The audio data is the data that is transmitted from the transmitting apparatus (DVD player) 20, for example.

The feature of the receiving apparatus (amplifier) 60 according to the present embodiment is that a plurality of functions for executing a flow control by transmitting the control signal from the CPU 17 are provided. These functions are given as follows.

(1) A first detecting function for detecting change of the sampling frequency of the audio data D1, (2) a first controlling function for controlling to stop the writing of the audio data D1 into one buffer in response to an output of the first detecting function, (3) a first reference clock changing function for changing a frequency of a first reference clock CK1 in response to the output of the first detecting function, (4) a second controlling function for controlling to start the writing of the audio data D1 into the other buffer in response to the output of the first detecting function, (5) a second detecting function for detecting that the data in the one buffer becomes empty, (6) a third controlling function for controlling to stop the reading of the audio data D2 from the one buffer in response to an output of the second detecting function, (7) a second reference clock changing function for changing a frequency of a second reference clock CK2 in response to the output of the second detecting function, and (8) a second controlling function for controlling to start the reading of the audio data D2 from the other buffer in response to the output of the second detecting function.

A flow controlling method of the receiving apparatus according to the sixth embodiment will be explained with reference to FIG. 10 hereunder.

Figure 10:
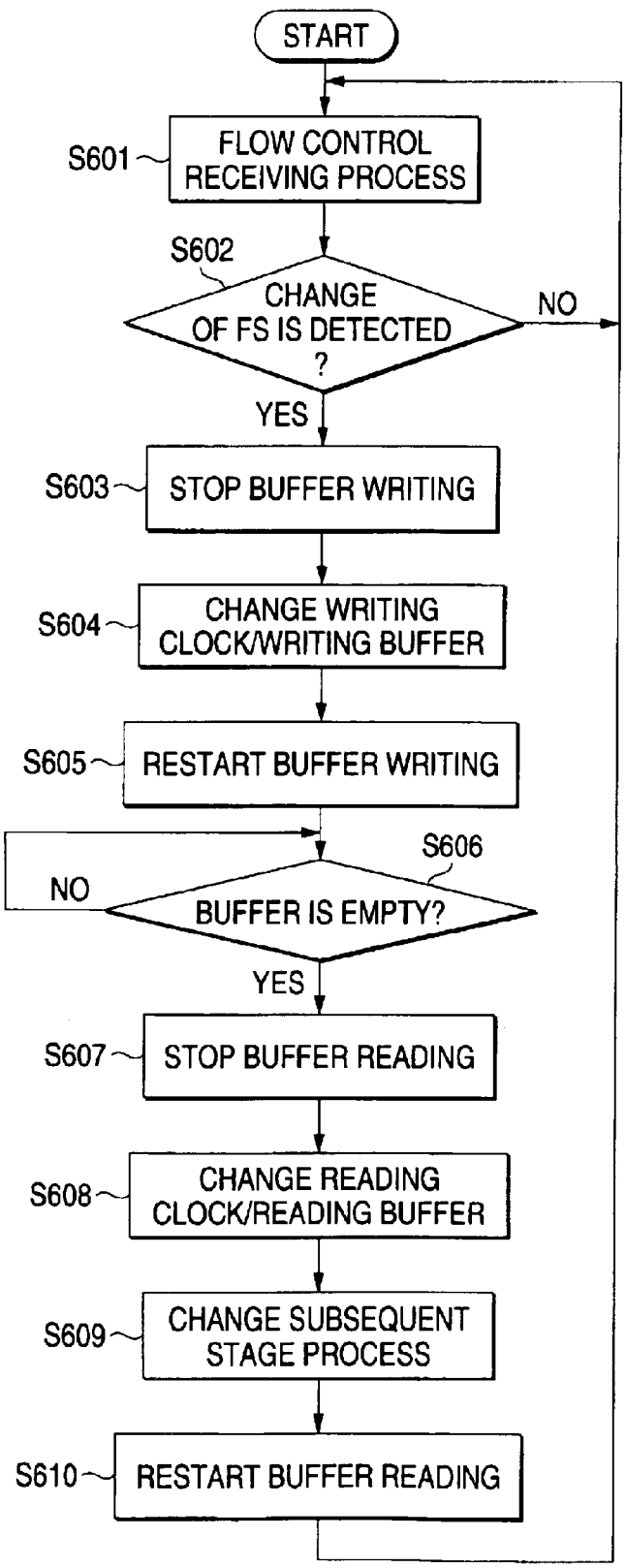
FIG. 10 is a flowchart showing a flow controlling method of the receiving apparatus according to the sixth embodiment.

First, as shown in FIG. 10, the receiving apparatus (amplifier) 60 executes a flow control receiving process (step S601).

Then, the process of detecting whether or not the FS is changed is carried out (step S602). Then, the process in step S603 is carried out if the change of the FS is detected (Yes), while the process goes back to step S601 unless the change of the FS is detected (No).

Then, the writing of the audio data D1 into the writing buffer (buffer 12a or buffer 12b) is stopped by supplying the writing stop control signal from the CPU 17 to the buffer 12 (step S603).

Then, the reference clock CK1 on the writing side is changed by sending the control signal from the CPU 17 to the buffer 12 and the reference clock changing switch 16a to thus change the writing buffer (from the buffer 12a to the buffer 12b or from the buffer 12b to the buffer 12a)(step S604).

Then, the writing into the buffer (the buffer 12a or the buffer 12b) is restarted by sending the writing restart control signal from the CPU 17 to the buffer 12 (step S605).

Then, it is detected whether or not the reading buffer is empty (step S606) Then, the process in step S607 is carried out if it is detected that the reading buffer is empty (Yes), while the detection to decide whether or not the reading buffer is empty is repeated unless it is detected that the reading buffer is empty (No).

Then, the reading of the audio data D2 from the reading buffer (the buffer 12a or the buffer 12b) is stopped by sending the reading stop control signal from the CPU 17 to the buffer 12 (step S607).

Then, the reference clock CK2 on the reading side is changed by sending the control signal from the CPU 17 to the buffer 12 and the reference clock changing switch 16b to thus change the reading buffer (from the buffer 12a to the buffer 12b or the buffer 12b to the buffer 12a) (step S608).

Then, the process of the audio signal that is output to the outside is changed by sending the control signal from the CPU 17 to the audio controlling portion 13 (step S609).

Then, the reading of the audio data from the reading buffer (the buffer 12a or the buffer 12b) is restarted by sending the reading restart control signal from the CPU 17 to the buffer 12 (step S610) Then, the process goes back to step S601.

Then, an isochronous cycle, which is a synchronization unit on IEEE1394 standard serial bus in the network shown in above first to sixth embodiments, will be explained with reference to FIG. 11 hereunder.

Figure 11:
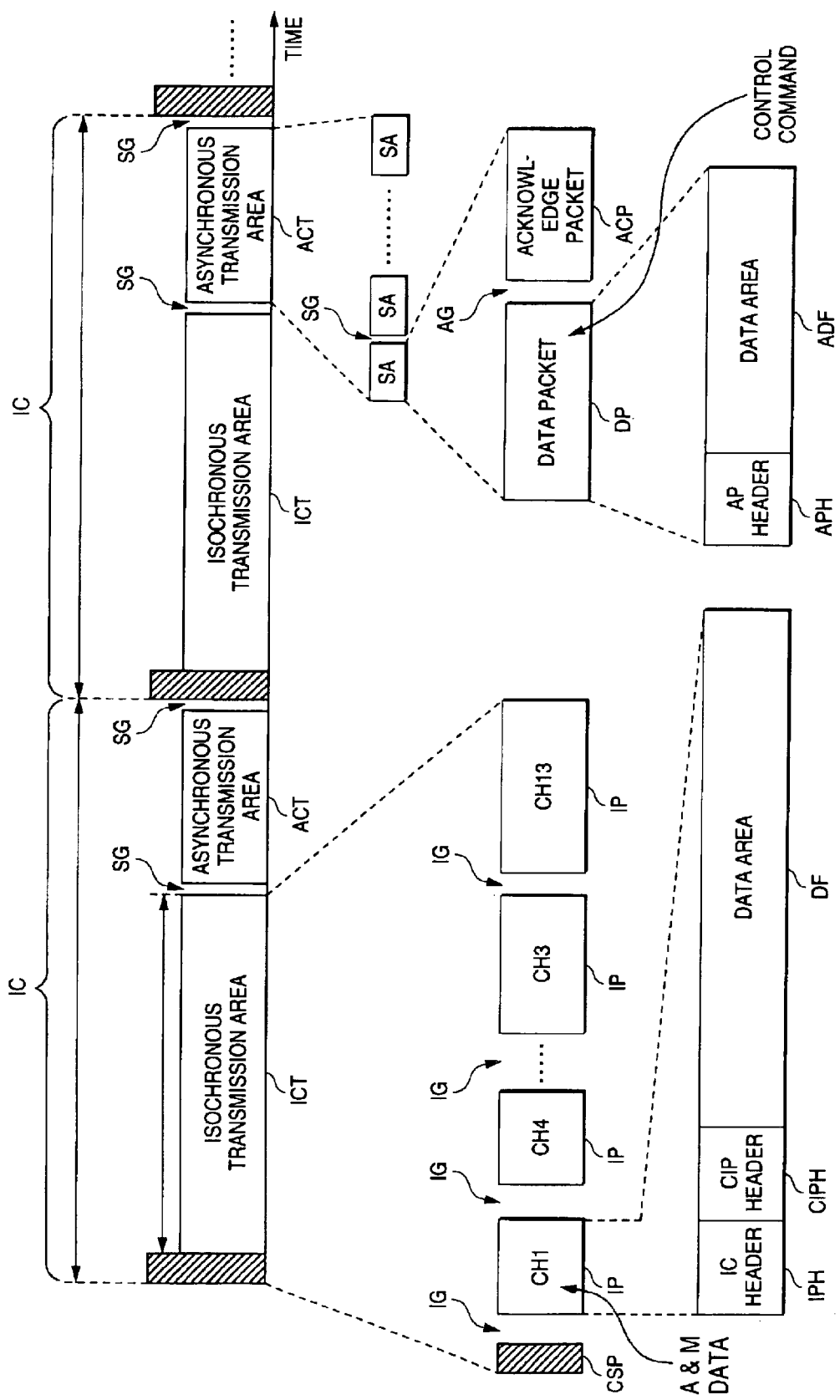
FIG. 11 is a view explaining a data structure in an isochronous cycle.

FIG. 11 is a view explaining a data structure in the isochronous cycle.

As shown in FIG. 11, the isochronous cycle IC is constructed with a cycle start packet CSP that is always inserted before the head of the isochronous cycle IC to set standard times of all nodes, an isochronous transmission area ICT that has isochronous packets IP of a plurality of channels in each of which the data corresponding to each channel are contained, and an asynchronous transmission area ACT in which asynchronous data such as the control signal, etc. are contained.

Also, a sub-action gap SG that is a time interval to indicate the end of the isochronous transmission area ICT or the end of an sub-action SA is inserted after the end of each isochronous transmission area ICT and the end of the asynchronous transmission area ACT.

In addition, an isochronous gap IG that is a time interval to indicate the end of each packet is inserted between the isochronous packets IP and between the cycle start packet CSP and the top isochronous packet IP.

At this time, a length of the above sub-action gap SG is set longer than a length of the isochronous gap IG.

The isochronous packet IP has an IP (Isochronous Packet) header IPH that contains the information indicating an amount of data in each isochronous packet IP, the information indicating the channel for transmitting the information in each isochronous packet IP, etc., a CIP (Common Isochronous Packet) header CIPH, and a data area DF that contains A&M data.

While, the asynchronous transmission area ACT has a plurality of asynchronous sub-actions SA. Each asynchronous sub-action SA has a data packet DP in which the data such as the control information being asynchronously transmitted are contained, and an acknowledge packet ACP in which the data used for the reply from the destination node are contained.

Here, an acknowledge gap AG that is a time interval to indicate the end of the data packet DP is inserted between the data packet DP and the acknowledge packet ACP.

The data packet DP is constructed with an AP (Asynchronous Packet) header APH that contains the information indicating the address of each data packet DP, etc., and a data area ADF that contains the control signal, etc.

As described above, according to the receiving apparatus according to the first aspect of the invention and the flow control method of the receiving apparatus according to the ninth aspect of the invention, when the sampling frequency is changed, the data in the buffer is cleared and also the reference clock is changed into the reference clock that corresponds to the changed sampling frequency.

Therefore, there can be provided the receiving apparatus and its flow control method capable of reproducing the high quality audio even if the sampling frequency is changed.

According to the receiving apparatus according to the second aspect of the invention and the flow control method of the receiving apparatus according to the tenth aspect of the invention, when the sampling frequency is changed, the writing into the buffer is stopped and then the reference clock is changed into the reference clock that corresponds to the changed sampling frequency after the buffer becomes empty.

Therefore, since the writing into the buffer is stopped, the data obtained before the sampling frequency is changed can be prevented from being written into the buffer, so that there can be provided the receiving apparatus and its flow control method capable of reproducing the higher quality audio.

According to the transmitting apparatus according to the third aspect of the invention and the flow control method of the transmitting apparatus according to the eleventh aspect of the invention, the data reproduction is brought into the pause state every time when the track is changed, and then the pause state is canceled to restart the data reproduction when the pause cancel signal is received.

Also, according to the receiving apparatus according to the fourth aspect of the invention and the flow control method of the receiving apparatus according to the twelfth aspect of the invention, the pause state on the transmitter side is detected and then the writing into the buffer is stopped when the sampling frequency is changed. After the buffer becomes empty, the reference clock is changed into the reference clock that corresponds to the changed sampling frequency and also the pause cancel signal to restart the operation on the transmitter side is transmitted.

Therefore, since the sampling frequency is changed in the state that the data reproduction of the transmitting apparatus is stopped, the situation that the beginning portion of the data reproduced after the change is disposed can be prevented, so that there can be provided the receiving apparatus and its flow control method and also the transmitting apparatus and its flow control method capable of reproducing the high quality audio.

According to the receiving apparatus according to the fifth aspect of the invention and the flow control method of the receiving apparatus according to the thirteenth aspect of the invention, when the sampling frequency is changed, the signal that brings the data reproduction into the pause state is transmitted to the transmitter side and thus the writing into the buffer is stopped. Then, after the buffer becomes empty, the reference clock is changed into the reference clock that corresponds to the changed sampling frequency, and also the pause cancel signal that restarts the operation on the transmitter side is transmitted.

Therefore, since the data reproduction of the transmitting apparatus can be stopped when the sampling frequency is changed, the situation that the beginning portion of the data reproduced after the sampling frequency is changed is disposed can be prevented, so that there can be provided the receiving apparatus and its flow control method capable of reproducing the high quality audio.

According to the transmitting apparatus according to the sixth aspect of the invention and the flow control method of the transmitting apparatus according to the fourteenth aspect of the invention, the data reproduction is set into the pause state when the sampling frequency is changed, and then the pause state is canceled to restart the data reproduction when the pause cancel signal is received.

According to the receiving apparatus according to the seventh aspect of the invention and the flow control method of the receiving apparatus according to the fifteenth aspect of the invention, when the change of the sampling frequency is detected, the writing into the buffer is stopped. Then, after the buffer becomes empty, the reference clock is changed into the reference clock that corresponds to the changed sampling frequency and also the pause cancel signal to restart the operation on the transmitter side is transmitted.

Therefore, the data reproduction can be set previously into the pause state at the time when the sampling frequency is changed, so that there can be provided the receiving apparatus and its flow control method and also the transmitting apparatus and its flow control method capable of reproducing the high quality audio.

According to the receiving apparatus according to the eighth aspect of the invention and the flow control method of the receiving apparatus according to the sixteenth aspect of the invention, when the sampling frequency is changed, the reading of the data that is obtained before the change from one buffer is still continued and also the data that is obtained after the change is written into the other buffer after the reference clock on the writing side is changed. Then, the reference clock on the reading side is changed as soon as the data in one buffer is out, and then the buffer to be read is switched into the other buffer.

Therefore, since two buffers are alternatively employed, the disconnection of the audio when the buffer is cleared is not generated, so that there can be provided the receiving apparatus and its flow control method capable of reproducing continuously the high quality audio.

What is claimed is:

1. A receiving apparatus comprising:
   a buffer for storing data received from a network;
   a detecting device for detecting change of a sampling frequency of the data;
   a first controlling device for controlling to stop writing of the data into the buffer and reading of the data from the buffer in response to an output of the detecting device;
   a clearing device for clearing the data in the buffer in response to the output of the detecting device;

a clock changing device for changing a frequency of a reference clock in response to the output of the detecting device; and a second controlling device for controlling to restart the writing of the data into the buffer and the reading of the data from the buffer in response to the output of the detecting device, wherein the data stored in the buffer is read based on the reference clock.

2. A receiving apparatus comprising:

a buffer for storing data received from a network;

a first detecting device for detecting change of a sampling frequency of the data;

a first controlling device for controlling to stop writing of the data into the buffer in response to an output of the first detecting device;

a second detecting device for detecting that the data in the buffer becomes empty;

a second controlling device for controlling to stop the reading of the data from the buffer in response to an output of the second detecting device;

a clock changing device for changing a frequency of a reference clock in response to the output of the second detecting device; and a third controlling device for controlling to restart the writing of the data into the buffer and the reading of the data from the buffer in response to the output of the second detecting device, wherein the data stored in the buffer is read based on the reference clock.

3. A receiving apparatus comprising:

a buffer for storing data received from a network;

a first detecting device for detecting a pause state on a transmitter side;

a second detecting device for detecting change of a sampling frequency of the data in response to an output of the first detecting device;

a first controlling device for controlling to stop writing of the data into the buffer in response to an output of the second detecting device;

a third detecting device for detecting that the data in the buffer becomes empty;

a second controlling device for controlling to stop reading of the data from the buffer in response to an output of the third detecting device;

a clock changing device for changing a frequency of a reference clock in response to the output of the third detecting device;

a third controlling device for controlling to restart the writing of the data into the buffer and the reading of the data from the buffer; and a control signal transmitting device for transmitting a pause cancel signal to the transmitter side, wherein the data in the buffer is read based on the reference clock.

4. A receiving apparatus comprising:

a buffer for storing data received from a network;

a first detecting device for detecting change of a sampling frequency of the data;

a first controlling device for controlling to stop writing of the data into the buffer in response to an output of the first detecting device;

a first control signal transmitting device for transmitting a pause signal to a transmitter side;

a second detecting device for detecting that the data in the buffer becomes empty;

a second controlling device for controlling to stop reading of the data from the buffer in response to an output of the second detecting device;

a clock changing device for changing a frequency of a reference clock in response to the output of the second detecting device;

a third controlling device for controlling to restart the writing of the data into the buffer and the reading of the data from the buffer in response to the output of the second detecting device; and a second control signal transmitting device for transmitting a pause cancel signal to the transmitter side in response to the output of the second detecting device, wherein the data in the buffer is read based on the reference clock.

5. A transmitting apparatus constructed to transmit reproduced data to a network, the transmitting apparatus comprising:

a first detecting device for detecting change of a sampling frequency of the data;

a first setting device that sets an information format dependent field (FDF) associated with an audio data in a predetermined value when the change of the sampling frequency of the data is detected;

a first controlling device for setting data reproduction to a pause state in response to an output of the first detecting device;

a second detecting device for detecting reception of a pause cancel signal; and a second controlling device for canceling the pause state in response to an output of the second detecting device.

6. A receiving apparatus comprising:

a buffer for storing data received from a network;

a first detecting device for detecting change of a sampling frequency of the data;

a first controlling device for controlling to stop writing of the data into the buffer in response to an output of the first detecting device;

a second detecting device for detecting that the data in the buffer becomes empty;

a second controlling device for controlling to stop reading of the data from the buffer in response to an output of the second detecting device;

a clock changing device for changing a frequency of the reference clock in response to the output of the second detecting device;

a third controlling device for controlling to restart the writing of the data into the buffer and the reading of the data from the buffer in response to the output of the second detecting device; and a control signal transmitting device for transmitting a pause cancel signal to a transmitter side, wherein the data stored in the buffer is read based on the reference clock.

7. A receiving apparatus comprising:

a plurality of buffers for storing data received from a network;

a first detecting device for detecting change of a sampling frequency of the data;

a first controlling device for controlling to stop writing of the data into one buffer in response to an output of the first detecting device;

a first clock changing device for changing a frequency of a first reference clock in response to an output of the first detecting device;

a second controlling device for controlling to start the writing of the data into other buffer in response to the output of the first detecting device;

a second detecting device for detecting that the data in one buffer becomes empty;

a third controlling device for controlling to stop the reading of the data from the one buffer in response to an output of the second detecting device;

a second reference clock changing device for changing a frequency of a second reference clock in response to the output of the second detecting device; and a fourth controlling device for controlling to start the reading of the data from the other buffer in response to the output of the second detecting device, wherein the data stored in the buffer is read based on the plurality of reference clocks.

8. A flow controlling method of a receiving apparatus comprising the steps of:

writing data received from a network into a buffer;

reading the data in the buffer based on a reference clock;

detecting change of a sampling frequency of the data;

controlling to stop writing of the data into the buffer and reading of the data from the buffer when the change of the sampling frequency of the data is detected;

clearing the data in the buffer;

changing a frequency of the reference clock; and restarting the writing of the data into the buffer and the reading of the data from the buffer.

9. A flow controlling method of a receiving apparatus comprising the steps of:

writing data received from a network into a buffer;

reading the data in the buffer based on a reference clock;

detecting change of a sampling frequency of the data;

stopping writing of the data into the buffer when the change of the sampling frequency of the data is detected;

detecting that the data in the buffer becomes empty;

stopping reading of the data from the buffer when it is detected that the data in the buffer becomes empty;

changing a frequency of the reference clock; and restarting the writing of the data into the buffer and the reading of the data from the buffer.

10. A flow controlling method of a receiving apparatus comprising the steps of:

writing data received from a network into a buffer;

reading the data in the buffer based on a reference clock;

detecting a pause state on a transmitter side;

detecting change of a sampling frequency of the data when the pause state on the transmitter side is detected;

stopping writing of the data into the buffer when the change of the sampling frequency of the data is detected;

detecting that the data in the buffer becomes empty;

stopping reading of the data from the buffer when it is detected that the data in the buffer becomes empty;

changing a frequency of the reference clock;

controlling to restart the writing of the data into the buffer and the reading of the data from the buffer; and transmitting a pause cancel signal to the transmitter side.

11. A flow controlling method of a receiving apparatus comprising the steps of:

writing data received from a network into a buffer;

reading the data in the buffer based on a reference clock;

detecting change of a sampling frequency of the data;

controlling to stop writing of the data into the buffer when the change of the sampling frequency of the data is detected;

transmitting a pause signal to a transmitter side;

detecting that the data in the buffer becomes empty;

stopping reading of the data from the buffer when it is detected that the data in the buffer becomes empty;

changing a frequency of the reference clock;

restarting the writing of the data into the buffer and the reading of the data from the buffer; and transmitting a pause cancel signal to the transmitter side.

12. A flow controlling method of a transmitting apparatus constructed to transmit reproduced data to a network, comprising the steps of:

detecting change of a sampling frequency of the data;

setting an information FDF associated with an audio data in a predetermined value when the change of the sampling frequency of the data is detected;

setting data reproduction to a pause state when the change of the sampling frequency of the data is detected;

detecting reception of a pause cancel signal; and canceling the pause state when the reception of the pause cancel signal is detected.

13. A flow controlling method of a receiving apparatus comprising the steps of:

writing data received from a network into a buffer;

reading the data in the buffer based on a reference clock;

detecting change of a sampling frequency of the data;

stopping writing of the data into the buffer when the change of the sampling frequency of the data is detected;

detecting that the data in the buffer becomes empty;

stopping reading of the data from the buffer when it is detected that the data in the buffer becomes empty;

changing a frequency of the reference clock;

restarting the writing of the data into the buffer and the reading of the data from the buffer; and transmitting a pause cancel signal to a transmitter side.

14. A flow controlling method of a receiving apparatus comprising the steps of:

writing data received from a network into a plurality of buffers;

reading the data in the buffers based on a plurality of reference clocks;

detecting change of a sampling frequency of the data;

stopping writing of the data into one buffer when the change of a sampling frequency of the data is detected;

changing a frequency of a first reference clock;

starting the writing of the data into other buffer;

detecting that the data in the one buffer becomes empty;

controlling to stop the reading of the data from the one buffer when it is detected that the data in the one buffer becomes empty;

changing a frequency of a second reference clock; and starting the reading of the data from the other buffer.

15. A receiving apparatus comprising:
a buffer for storing data received from a source;
a control circuit that detects a change of a sampling frequency of the data,
wherein, in response to detecting the change of the sampling frequency, the control circuit stops writing the data into the buffer, stops reading the data from the buffer, and deletes data in the buffer.

16. The receiving apparatus as claimed in claim 15, wherein the control circuit changes a frequency of a reference clock in response to detecting the change of the sampling frequency, and
wherein the control circuit resumes writing the data into the buffer and resumes reading the data from the buffer after changing the frequency of the reference clock, and
wherein the data stored in the buffer is read based on the changed reference clock.

17. A receiving apparatus comprising:
a buffer for storing data received from a source; and
a control circuit that detects a change of a sampling frequency of the data,
wherein the control circuit stops writing the data into the buffer in response to detecting the change of a sampling frequency of the data,
wherein the control circuit detects when the data in the buffer decreases to a predetermined level after stopping the writing of data into the buffer,
wherein, in response to detecting that the data has decreased to the predetermined level, the control circuit stops reading the data from the buffer and changes a frequency of a reference clock,
wherein, after changing the frequency of the reference clock, the control circuit resumes writing the data into the buffer and resumes reading the data from the buffer, and
wherein the data stored in the buffer is read based on the changed reference clock.

18. The receiving apparatus as claimed in claim 17, wherein the control circuit detects a pause state of a transmitter that transmits the data to the receiving apparatus, and
wherein the control circuit detects the change in the sampling frequency after detecting the pause state.

19. The receiving apparatus as claimed in claim 18, wherein the control circuit transmits a pause cancel signal to the transmitter after changing the reference clock.

20. The receiving apparatus as claimed in claim 17, wherein the control circuit transmits a pause signal to a transmitter transmitting the data to the receiving apparatus after detecting the change in the sampling frequency, and
wherein the control circuit transmits a pause cancel signal to the transmitter after changing the frequency of the reference clock.

21. A transmitting apparatus that transmits reproduced data to a network, comprising:
a control circuit that detects a change in reproduction of first reproduced data to second reproduced data,
wherein the control circuit pauses the reproduction in response to detecting the change in reproduction,
wherein the control circuit detects a reception of a pause cancel signal form a receiving apparatus after pausing the reproduction
wherein the control circuit resumes the reproduction in response to receiving the pause cancel signal, and
wherein the control circuit detects the change in reproduction of the first reproduced data to the second reproduced data by detecting data indicating a change of a sampling frequency between the first reproduced data and the second reproduced data.

22. The receiving apparatus as claimed in claim 17, wherein the control circuit transmits a pause cancel signal to a transmitter after changing the reference clock, and
wherein the transmitter transmits the data to the receiving apparatus.

23. A receiving apparatus that receives data from a source, comprising:
a first buffer that receives the data;
a second buffer; and
a control circuit that detects a change of a sampling frequency of the data,
wherein, in response to detecting the change of the sampling frequency, the control circuit stops writing the data into the first buffer, changes a frequency of a first reference clock, and starts writing the data into the second buffer.

24. The receiving apparatus as claimed in claim 23, wherein the control circuit detects when the data in the first buffer decreases to a predetermined level after data stops being written into the first buffer, and
wherein, in response to the data in the first buffer decreasing to the predetermined level, the control circuit stops reading the data from the first buffer, changes a frequency of a second reference clock, and starts reading the data from the second buffer.

25. A system that receives and transmits data through a network, comprising:
a transmitting apparatus constructed to transmit reproduced data to a network, the transmitting apparatus including;
a first detecting device of the transmitting apparatus that detects change of a reproduced track;
a first controlling device of the transmitting apparatus that sets data reproduction to a pause state in response to an output of the first detecting device of the transmitting apparatus;
a second detecting device of the transmitting apparatus that detects reception of a pause cancel signal; and
a second controlling device of the transmitting apparatus that cancels the pause state in response to an output of the second detecting device of the transmitting apparatus, and
a receiving apparatus including;
a buffer that stores data received from a network;
a first detecting device of the receiving apparatus that detects the pause state of the transmitting apparatus;
a second detecting device of the receiving apparatus that detects change of a sampling frequency of the data in response to an output of the first detecting device of the receiving apparatus;
a first controlling device of the receiving apparatus that controls to stop writing of the data into the buffer in response to an output of the second detecting device of the receiving apparatus;
a third detecting device of the receiving apparatus that detects when the data in the buffer becomes empty;
a second controlling device of the receiving apparatus that controls to stop reading of the data from the buffer in response to an output of the third detecting device of the receiving apparatus;
a clock changing device that changes a frequency of a reference clock in response to the output of the third detecting device of the receiving apparatus;

a third controlling device of the receiving apparatus that controls to restart the writing of the data into the buffer and the reading of the data from the buffer, and a control signal transmitting device that transmits a pause cancel signal to the transmitting apparatus, wherein the data in the buffer is read based on the reference clock.

26. A system that receives and transmits data through a network, comprising:

a transmitting apparatus constructed to transmit reproduced data to a network, the transmitting apparatus including;

a first detecting device of the transmitting apparatus that detects change of a sampling frequency of the data;

a first controlling device of the transmitting apparatus that sets data reproduction to a pause state in response to an output of the first detecting device of the transmitting apparatus;

a second detecting device of the transmitting apparatus that detects reception of a pause cancel signal; and a second controlling device of the transmitting apparatus that cancels the pause state in response to an output of the second detecting device of the transmitting apparatus; and a receiving apparatus including a buffer that stores the data received from a network;

a first detecting device of the receiving apparatus that detects change of a sampling frequency of the data;

a first controlling device of the receiving apparatus that controls to stop writing of the data into the buffer in response to an output of the first detecting device of the receiving apparatus;

a second detecting device of the receiving apparatus that detects that the data in the buffer becomes empty;

a second controlling device of the receiving apparatus that controls to stop reading of the data from the buffer in response to an output of the second detecting device of the receiving apparatus;

a clock changing device of the receiving apparatus that changes a frequency of the reference clock in response to the output of the second detecting device of the receiving apparatus;

a thin controlling device of the receiving apparatus that controls to restart the writing of the data into the buffer and the reading of the data from the buffer in response to the output of the second detecting device of the receiving apparatus; and a control signal transmitting device of the receiving apparatus that transmits a pause cancel signal to the transmitting apparatus, wherein the data stored in the buffer is read based on the reference clock.

* * * * *